INVENTORS
William S. Blondheim & Abner P. Patton
BY
Erich M. N. Raddue
agent

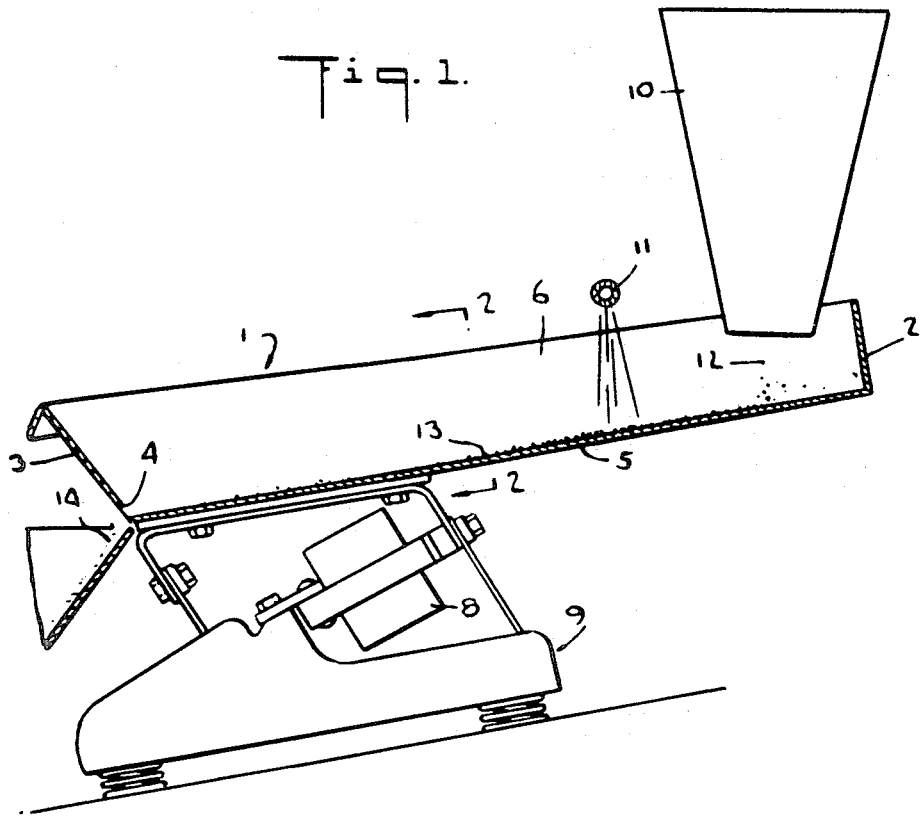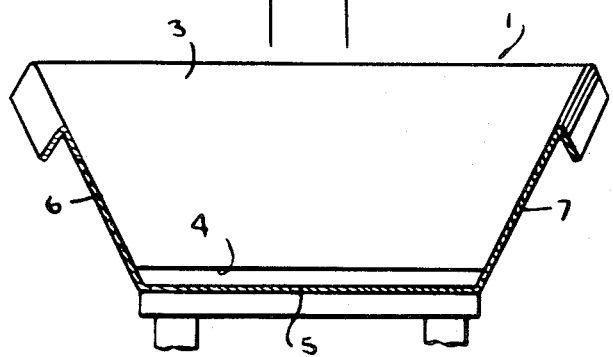

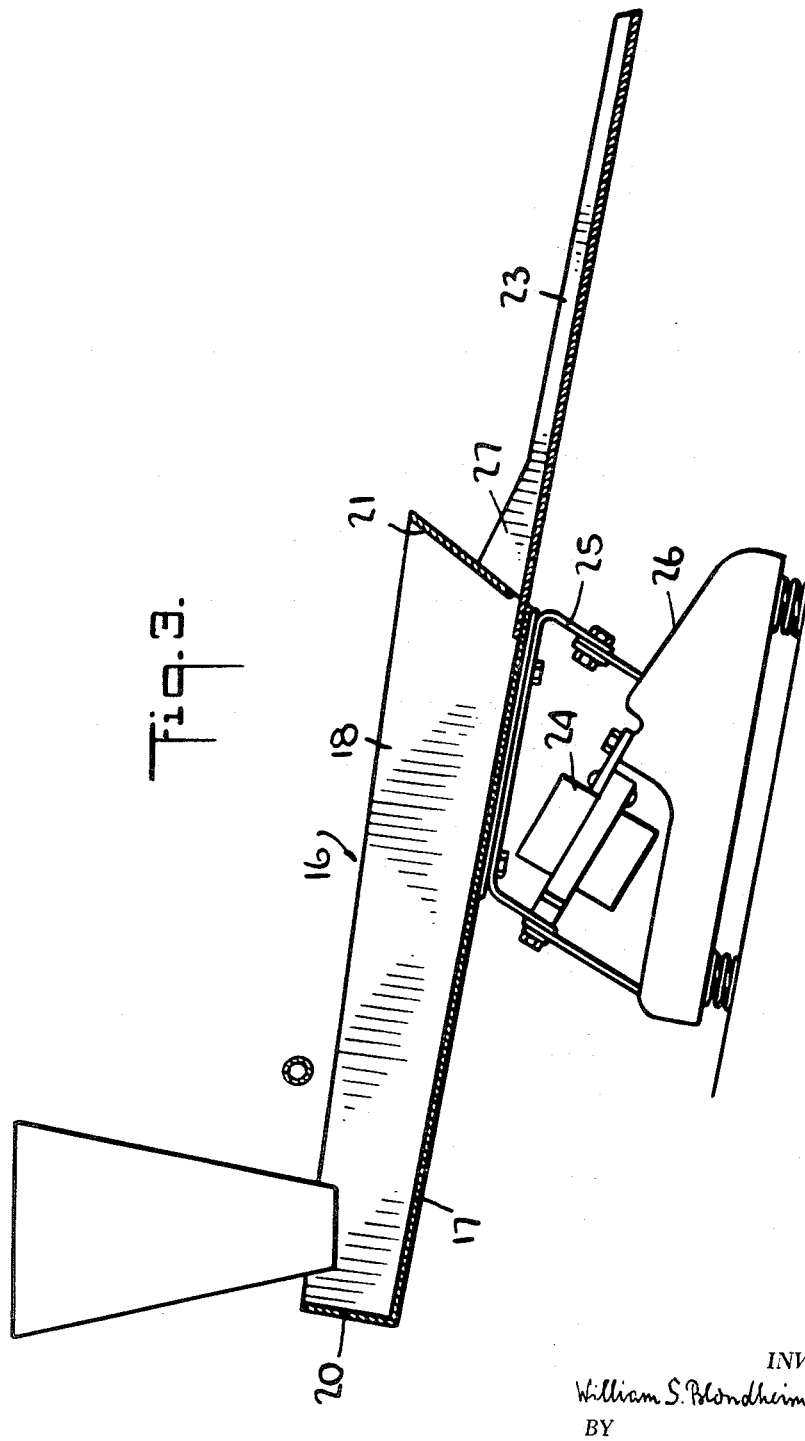

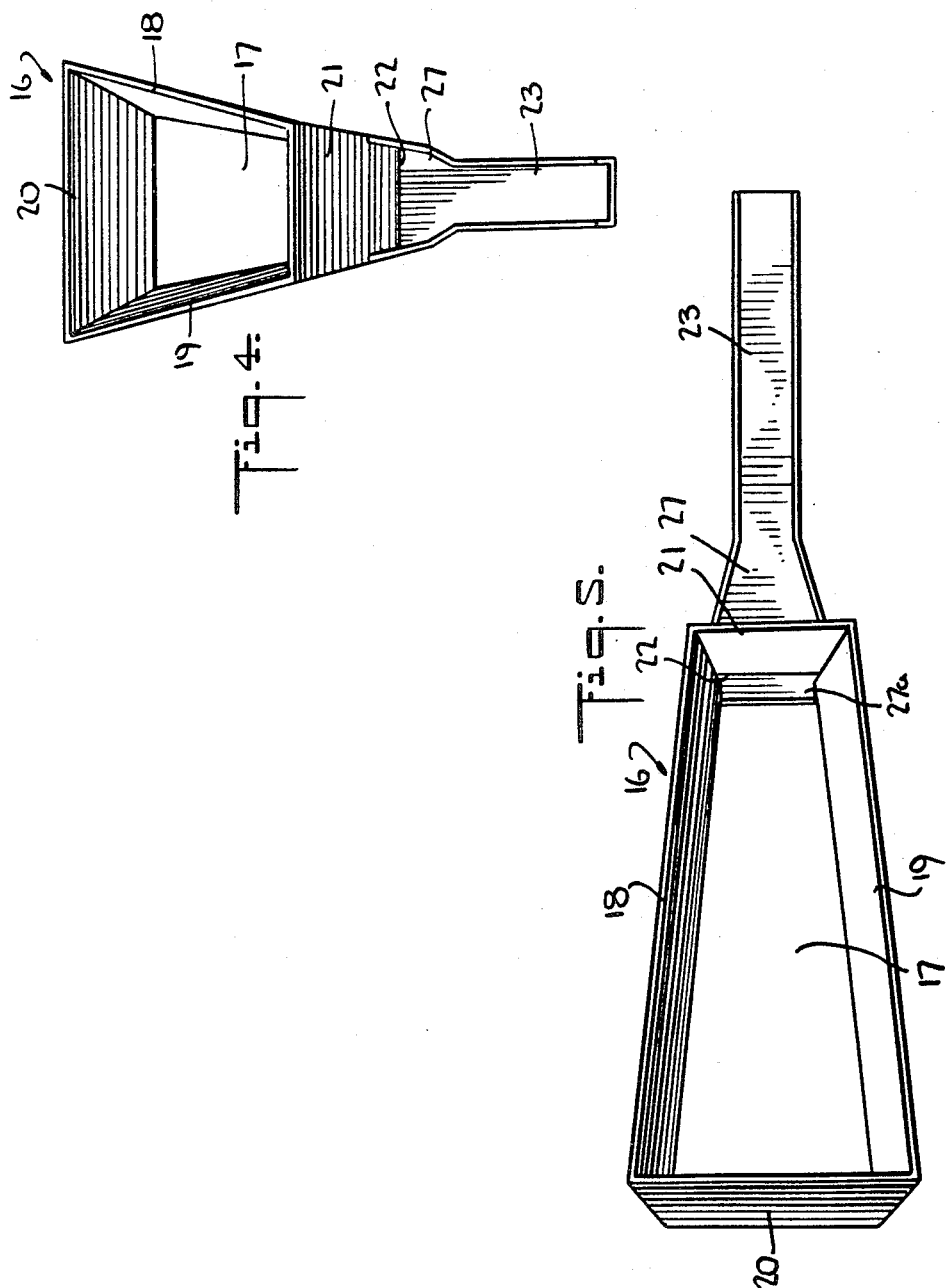

INVENTORS
William S. Blondheim & Abner P. Patton
BY

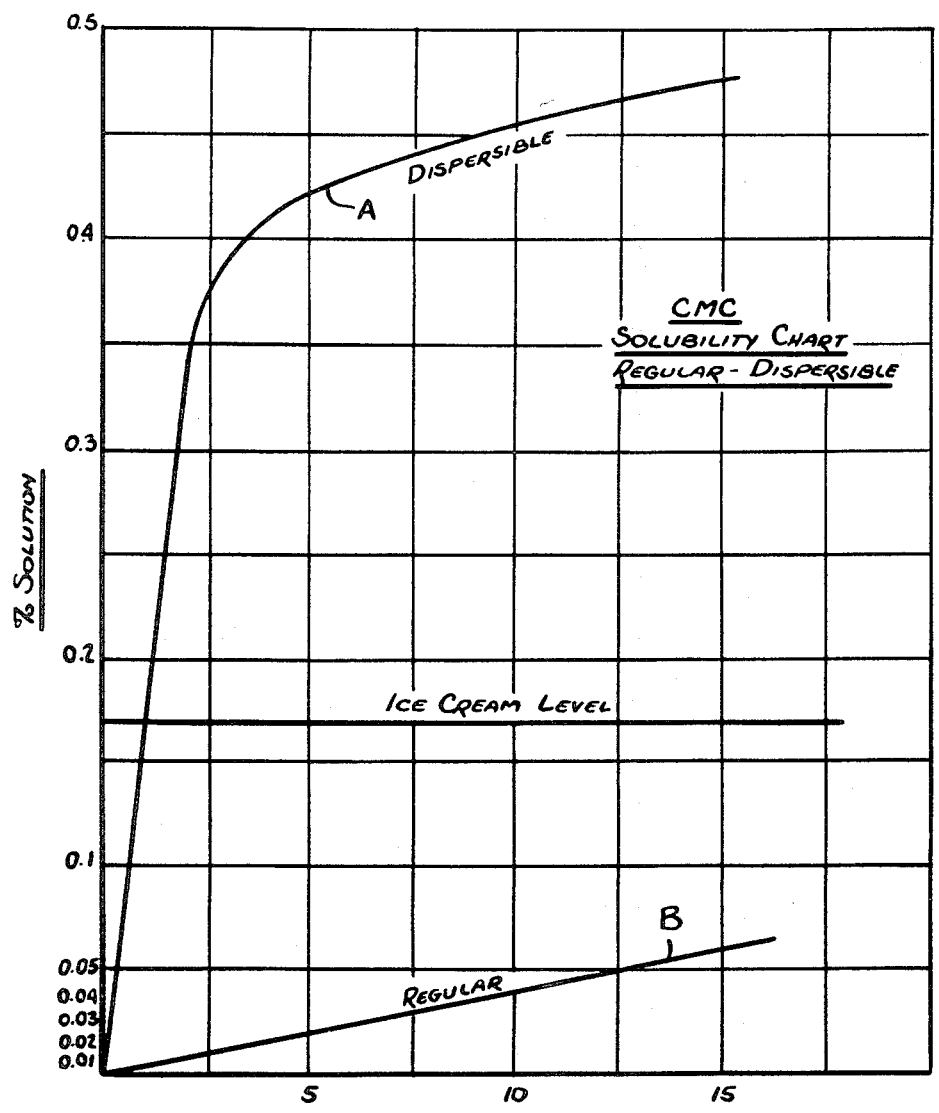

3,396,034
PROCESS OF CONVERTING DIFFICULTLY DISPERSIBLE MATERIALS INTO A READILY DISPERSIBLE FORM AND PRODUCTS OBTAINED THEREBY
William S. Blondheim, Westfield, and Abner P. Patton, Springfield, N.J., assignors to Motomco Inc., Clark, N.J., a corporation of New Jersey
Continuation-in-part of applications Ser. No. 731,382, Apr. 28, 1958, Ser. No. 820,681, June 16, 1959, and Ser. No. 96,547, Mar. 17, 1961. This application Jan. 20, 1964, Ser. No. 338,957
35 Claims. (Cl. 99—93)

ABSTRACT OF THE DISCLOSURE

This invention has for its purpose to convert difficultly dispersible particulate, solid materials into a readily dispersible form. The process consists in subjecting a difficultly dispersible starting material or a finely divided solid material to pulsating vibration while on an inclined plane and exposing the solid material thereon to the action of a finely divided spray of a liquid agent or, respectively, a liquid reagent, said agent or reagent causing swelling of the treated or reacted material. Thereby, the angle of inclination of the inclined plane is such that the untreated or, respectively, unreacted material moves upwardly on said inclined plane, while the treated or, respectively, reacted, readily dispersible material moves downwardly thereon. The process is applicable to all types of material capable of swelling on contact with water or a liquid. Examples of such materials which are rendered more readily dispersible by this process are water soluble cellulose ethers, such as carboxy methyl cellulose; vegetable gums; farinaceous materials such as wheat flour; plastics, such as polyacrylamide, polyvinyl pyrrolidone; inorganic materials such as boric acid, fertilizers such as triple superphosphate; dyestuffs and pigments; and others. The process has also proved of great value in the production, by reaction, for instance, of readily dispersible detergents, salts such as sodium caseinate, calcium arsenate, sodium molybdate, amino acetic acid, phenol formaldehyde condensation products, bromo or nitro benzoic acid, and others.

The resulting treated materials or, respectively, reaction products are readily dispersible in water, dust-free, noncrumbling, and free-flowing, and their particles repel each other on contact with water. Thus, they do not agglomerate and ball up when added to water. They have a bulk density lower than that of the untreated material.

---

The present invention relates to readily dispersible products or mixtures of products which, in their presently available form, are hard to disperse in water or other media to form colloidal solutions, suspensions, or dispersions thereof, and more particularly to readily dispersible cellulose ethers and the like materials, such as sodium carboxy methyl cellulose, and to a process of converting such materials which, in their presently available form, are difficult to disperse, into readily dispersible materials.

The present application is a continuation-in-part-application of copending applications Ser. No. 731,382, filed Apr. 28, 1958, now abandoned, and entitled "Process of Converting Difficultly Dispersible Materials into a Readily Dispersible Form, and Products Obtained Thereby," Ser. No. 820,681, filed June 16, 1959, now abandoned and entitled "Process of and Apparatus for Producing Granular Material From More Finely Divided Material," and Ser. No. 96,547, filed Mar. 17, 1961, now abandoned, and entitled "Continuous Treatment of Pulverulent Material With a Liquid Spray."

A great many powdered materials have the tendency to resist free flow through an orifice and/or the ready formation of solutions, colloidal solutions, or suspensions in liquid solvent media. Many particulate materials contain objectionable amounts of fines. The considerable industrial importance of converting such materials into a granular form which no longer shows the objectionable features of the more finely divided materials was recognized early and many methods and machines have been developed for this purpose. They have involved, however, massive and correspondingly expensive equipment. Such apparatus and methods of operation are not only exceedingly costly but they have presented many cleaning problems between the treatment of different products and, moreover, they are in most instances quite inefficient because the throughput is slow and/or the quantity of finely divided material which is converted into the desirable granular form is no more than about 10% to 30% per "pass." This requires extensive screening apparatus and the vast quantities of screened fines must then be returned to the treatment zone. All of this makes these known procedures highly uneconomical, the initial investment in the equipment being huge and its output being relatively low.

It has been recognized that finely divided materials may be made more readily dispersible when their fine particles are agglomerated in the presence of a suitable agent and such granulation processes have been more recently applied in particular to the production of "instant" products, such as instant milk, gelatin and the like. In the known production of these "instantly" soluble particulate materials, the material in its finely divided and hard-to-disperse form is dropped or cascaded through a water vapor or mist. The quantity of the resultant granulated and accordingly more readily dispersible or instantly soluble material is small for each treatment cycle, which necessitates extensive separating and classifying equipment, the fines being recycled for repeated treatment. These production methods are accordingly tedious, inefficient, and expensive.

It has also been proposed to spread particulate material in a thin layer, to spray the spread-out particles with a coating agent, then to vibrate or shake the particle layer to expose different portions of the particle surfaces, and then to spray the particles again with the coating agents.

Many particulate products which are widely used in the chemical, textile, food, cosmetic, pharmaceutical, and the like industries, for instance, are hard to disperse in water or other solvent media in their commercially available form. Usually, they must be vigorously stirred in their solvent media for hours to produce uniform solutions or dispersions, their tendency being to ball up in lumps upon addition to such media. By way of example, important particulate products of this type include cellulose ethers, especially sodium carboxy methyl cellulose, also known as "CMC" or sodium cellulose glycolate, and methyl cellulose; vegetable gums, including tragacanth, locust bean gum, gum arabic, or guar gum, karaya gum, mesquite gum, Indian or Ghatti gum, Sterculia gum and others; flour; starch; dextrins; dextrans; pectins; Irish moss extracts or carragheen; agar; sodium alginate; water-soluble plastics, such as polyvinyl pyrrolidone, polyacrylamide sold under the trademark "PAM" (American Cyanamid Company) and others; inorganic materials such as boric acid, lime, and others. Many attempts have been made heretofore to solve this problem. However, none of these attempts have proved to be fully successful. Therefore, the art had to make allowance for the time required to effect complete and uniform dispersion and dissolution of such materials in water or other media.

Many other particulate materials which are used in granular form, such as fertilizers, pigments, sulfur, and others contain objectionable amounts of fines whose ready removal is of great practical importance.

It is a principal object of the present invention to provide a simple, efficient, and economical process and apparatus for granulating finely divided material to obtain a substantially dust-free and free-flowing granular material.

It is a concomitant object of this invention to apply this simple, efficient and economical process and apparatus to hard-to-disperse powdered materials to make them readily dispersible or soluble in liquid solvent media.

It is a more particular object of the invention to improve the dispersibility or solubility of otherwise difficultly dispersible particulate materials and thus considerably to reduce the time required for producing complete and uniform solutions or dispersions of the materials in water or other solvent media wtihout substantially changing or disadvantageously modifying desirable physical and chemical properties of the material of their solutions or dispersions, such as viscosity, taste, stabilizing action, and the like.

It is also an object of the invention to produce substantially dust-free and free-flowing granular materials which in their presently available form present a dust problem in handling, processing and other applications.

It is one specific object of the present invention to produce a sodium carboxy methyl cellulose and like substantially solid, particulate materials which may be substantially instantaneously dispersed or dissolved in water or other solvent media without any substantial change or modification of the physical properties of the resulting dispersions or solutions.

It is another specific object of the invention to convert substantially solid, particulate materials which are not soluble in a given liquid medium into a granular and substantially dust-free form in which they may be readily dispersed in such a medium. Such materials include pigments, such as titanium dioxide, sulfur, and others.

Still another object of the present invention is to effectively treat or, respectively, react finely divided or pulverulent solid materials with a liquid agent, wherever such treatment or reaction is desired, whereby the reacted material is obtained in granulated, readily dispersible and dust-free form.

Other objects of the present invention and advantageous features thereof will become apparent as the description proceeds.

In principle, it has been found that the above and other objects are efficiently and relatively inexpensively accomplished according to this invention and readily dispersible, granular free-flowing, and substantially dust-free materials or, respectively, reaction products are obtained from substantially solid, divided materials when the finely divided material is fluidized and conveyed on a vibrating inclined surface while being sprayed with a swelling agent or, respectively, liquid reactant, continuously new surfaces of the material particles being exposed to the spray by the vibration which also separates the treated particles from the untreated ones, the partially swollen or, respectively, the reacted particles being conveyed downwardly on the inclined vibrating surface, while the untreated or, respectively, unreacted particles are conveyed upwardly thereon to be subsequently exposed to additional spraying.

Thus in principle, the process according to the present invention comprises subjecting powdered or finely divided sodium carboxy methyl cellulose or other difficultly dispersible material to the action of water in predetermined controlled amounts while being in movement on a vibrating plane, i.e. while being subjected to a vibrating treatment on moving on said plane. Water is applied, for instance, in the form of a fine mist produced by atomizing, of steam, or of air saturated with water. According to a preferred embodiment of the present invention which reduces, or completely eliminates, the dust problem, an apparatus known to the art as vibrating feeder is used for carrying out the water treatment while vibrating.

In principle, such vibrating feeder consists of a table which is subjected to vibrations and which is more or less downwardly inclined. The sodium carboxy methyl cellulose is supplied to the upper part of said downwardly inclined table which is preferably shaped in the form of a trough. Water is sprayed in the required amount upon the material present in the upper part of said vibrating feeder. Surprisingly, substantially only that portion of the material which has been converted into a readily dispersible form by said treatment with water is progressively moved forward and downward in a thin layer toward the lower end of the vibrating feeder and is continuously withdrawn therefrom. The untreated or insufficiently treated material remains at the upper end of the vibrating feeder or, if carried along by the treated material, flows upward toward the upper end of the inclined vibrating trough or table and, thus, is further treated with water. The vibrating feeder not only permits continuous treatment of the sodium carboxyl methyl cellulose or other difficultly dispersible materials but also continuous classification and separation of untreated or insufficiently treated material from the desired readily water dispersible material. Any untreated or insufficiently treated material which might have been carried along by the treated material discharged from the vibrating feeder, can readily be separated therefrom by subsequent screening since its particle size is considerably smaller than that of the treated material.

Although the process according to the present invention is by no means limited to the following explanation, the theory may be advanced that the particles of sodium carboxy methyl cellulose or the like material are partly or, respectively, superficially hydrated.

The vibrating trough or table or at least its lower part may be heated, for instance, by the use of infrared light or by other means. Thereby, condensation of moisture on the surface of the trough or table is avoided and the treated product is provided in dry form when withdrawn from the vibrating feeder. In this manner subsequent drying of the treated material is avoided.

The angle of inclination of the trough or table may be varied, for instance, between about 10° and about 60° and preferably between about 15° and about 30°. It has been found advantageous not only to incline this table or trough but also to incline the electromagnet causing vibration of the table or trough so that the particles of the material to be treated are repeatedly thrown upwardly and forwardly at the respective angle more or less in synchronism with the pulsations. By the adjustment of said angle of inclination, the particle size and/or the apparent bulk density of the treated sodium carboxy methyl cellulose is controlled in relation to vibration rate and vibration intensity. The higher the vibration rate, the greater must be the angle of inclination.

The amount of water applied to the material to be treated varies in accordance with the nature of the material and its properties. In the case of sodium carboxy methyl cellulose the preferred amount of water is about 10% of the weight of the material. Other materials might require larger or smaller amounts of water.

Simple preliminary experiments permit to determine the proper angle of inclination of the trough, the vibration rate, and the vibration intensity as well as the amount of water to be employed in order to produce material of the desired particle size, apparent bulk density, and degree of solubilization and partial hydration. Rate and intensity of vibration as well as angle of inclination govern also the classifying action of the trough or table of the vibrating feeder.

The temperature during treatment of sodium carboxy methyl cellulose or other difficultly dispersible material with water may vary. Operation at room temperature, when spraying the material with a fine mist of water or at a temperature of 45° C. to 50° C. when using air saturated with water has proved to yield satisfactory results, although higher or lower temperatures may also be used.

Other materials than sodium carboxy methyl cellulose which are rather hard to disperse in water or other media as they have been mentioned hereinabove, can also be partly hydrated and, thus, solubilized in about the same manner as described hereinbefore for sodium carboxy methyl cellulose. Thereby products are obtained which can readily and rapidly be dispersed and/or dissolved in water or other media and which yield solutions or dispersions of about the same physical properties as untreated material.

Although the treated sodium carboxy methyl cellulose and the like material is readily dispersible in water and does not require the presence of a wetting agent it might occasionally prove of advantage to prepare a material containing a wetting agent in order to uniformly distribute such an agent through the resulting solution or dispersion of the treated material. For this purpose it has proved of advantage to dissolve the wetting agent in the water with which the difficultly dispersible material is sprayed or otherwise treated.

It is understood that other chemical agents than wetting agents may be added to the aqueous hydrating agent used for treating such materials. For instance, deodorizing agents, perfumes and masking agents, dyestuffs, and others may be added thereto and the material may be sprayed or otherwise treated with such aqueous solutions.

It is also possible to use, in place of water or aqueous media, other liquids for the treatment of sodium carboxy methyl cellulose and other materials. For instance, a treatment with alcohol has proved as satisfactory as that of water for causing solubilization of the sodium carboxy methyl cellulose particles. Although in most instances water or aqueous media will be used in view of their low costs, the treatment with organic solvents such as alcohol, acetone, acetic acid esters, and other solvents is of advantage in all those instances where the material to be treated is sensitive to or decomposed by water. The treatment with other liquids than water or aqueous media has the further advantage that it is possible to simultaneously treat the sodium carboxy methyl cellulose and the like material with chemical agents which are not soluble in water but which are soluble in such organic solvents.

A suitable apparatus used for carrying out the vibrating treatment with water or other liquid according to the present invention may be of any type wherein the material to be treated can be exposed simultaneously to vibration and to finely divided sprays of water or other liquids.

According to a preferred embodiment of the present invention a commercially effective and useful throughput of granular particles is accomplished if a major portion, i.e. more than 50%, preferably about 60%, of the vibrating supporting surface is unsupported.

There are at present no theories to account for these totally unexpected results in obtaining commercially efficient operations, but extensive experimental data covering a great variety of particulate materials treated in accordance with the invention bear out the criticality of the treating surface inclination as well as its unsupported state during vibration for obtaining most satisfactory results. With these teachings it will be obvious that other mechanical arrangements may be employed to impart equivalent motion conditions of amplitude and direction.

It has been found that, when finely divided material is fed onto a vibrating surface, for instance, into a trough, the vibrating action will mix the material with air and thus fluidize the material. Simultaneously, the vibration will cause the fluidized material to be conveyed upwardly on the inclined vibrating surface and to pile up against the upper closed end of the surface or trough. The fluidized material is then treated with a vapor, mist, or finely divided spray of a liquid swelling or treating agent which may or may not be admixed with other chemical treating agents which may or may not be chemically reactive with the starting material. Impingement of these agents on the fluidized particles causes them to absorb varying quantities thereof and to form discrete, granular particles, in general of spongelike structure. The treated granular particles are conveyed downwardly through an outlet at the lower end of the inclined surface while the fines or untreated or insufficiently treated particles continue to move upwardly to be exposed to further spray treatment. After removal of the volatile treating agent or agents, the granular particles of the treated material are found to be readily dispersible in liquid media desired for such dispersion and to form free-flowing and dust-free masses of granules.

The invention will be more fully described and particularly exemplified in the following description taken in conjunction with an embodiment of a novel apparatus for carrying out the invention and illustrated in the accompanying drawing wherein FIG. 1 is a side elevational view of the apparatus, with portions broken away;

FIG. 2 is a section along line 2—2 of FIG. 1;

FIG. 3 is a side elevational view of a modified granulating apparatus according to the invention;

FIG. 4 is an end view of FIG. 3;

FIG. 5 is a top view of FIG. 3;

FIG. 10 is a graph showing the difference in the dispersal rate between commercially available sodium carboxy methyl cellulose and sodium carboxy methyl cellulose granulated according to the present invention.

Figure 6:
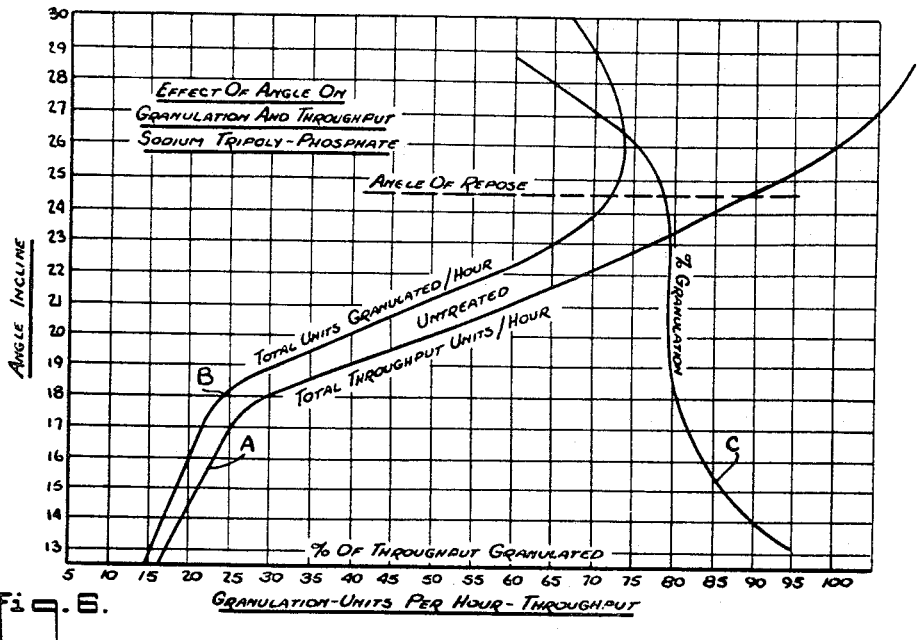
FIG. 6 is a graph showing the effect of the angle of incline on the granulation and throughput.

Referring now to the drawing, there is shown a trough 1 formed with a bottom plate 5 and side walls 6 and 7 for confining finely divided material 12 fed to the trough through hopper 10. Bottom plate 5 constitutes an inclined supporting surface for the finely divided material, forming an angle of inclination $\alpha$ with the horizontal. The smoother the surface of plate 5, the larger the rate of flow, a rough surface conversely causing a slower flow rate. A useful surfacing material for a smooth plate is the plastic material sold under the trade name Formica, for instance. The upper end of the trough is closed by end wall 2 while a baffle 3 with a slot 4 constitutes the outlet or discharge end of the trough, the granulated material 14 leaving the treating zone through slot 4.

As shown, the lower portion of the trough is mounted on leaf springs 15 which are vibrated by device 8 carried on resiliently mounted frame 9. When the device 8 is actuated, spring support 15 and trough 1 are subjected to pulsating vibration. Vibrating device 8 may be a pulsating magnet, but other suitable vibrators, such as pneumatic, spring- or eccentric-actuated vibrating devices, or the like, may be used, as will be obvious to the skilled in the art.

The upper and major portion of the supporting surface 5 is unsupported, the ratio of supported to unsupported surface portion being, for instance, between 1:1¼ to 1:2. The angle of inclination $\alpha$ is at least 10° and is preferably between 15° and 35°.

Vibrating device 8 is so adjusted that the surface 5 is vibrated at about 500 to about 10,000, preferably at about 1500 to 4000, impulses per minute and at strokes of $\frac{1}{125}''$ to $\frac{1}{4}''$, preferably between about $\frac{1}{64}''$ to $\frac{1}{8}''$.

As shown, the finely divided material 12 is fed into trough 1 while the trough is subjected to pulsating vibration. A spraying device 11 impinges a spray or mist of a desired treating agent on the finely divided material which has a tendency of being conveyed upwardly against end wall 2 by the vibrating action.

For instance, one or more De Vilbiss medical atomizers may be used for spraying the material to be treated. Said atomizers are arranged at places only 6 inches to 12 inches above the trough. All other reaction conditions remain the same. The pressure under which the water is atomized is between about 1 lb. and about 2 lbs. It is, of course, also possible to use other spraying devices, for instance, devices operating under a much higher pressure. As the particles of the finely divided material are granulated under the action of the spray on the fluidized material 13, the partially treated or untreated fines in the material continue their tendency of moving upwardly for further treatment while the continued vibration separates the fines from the granules and moves the granulated material 14 downwardly on the inclined surface toward discharge outlet 4.

The apparatus illustrated in FIGS. 3 to 5 increases efficiency of granulation essentially to 100% per pass. The vibratory granulator is substantially similar to that of FIG. 1 and includes a trough 16 formed with a bottom plate 17, side walls 18 and 19 and end wall 20 to close the upper end of the trough. Finely divided material is fed to the trough near its closed upper end as in the embodiment of FIG. 1. Bottom plate 17 constitutes an inclined supporting surface for the finely divided material during its granulation, the illustrated angle being 25°. A baffle 21 closes the lower end of the trough, except for a slot 22 left between the bottom plate and the baffle to constitute the outlet or discharge end of the granulator, wherethrough the treated material passes onto chute 23.

The trough is mounted on a conventional vibrator assembly 24, a leaf spring 25 supporting the lower end of the trough while its upper portion is unsupported. The vibrator and spring are mounted on a base 26 which is inclined similarly to the bottom plate of the vibratory trough.

As in the embodiment of FIG. 1, the finely divided material is sprayed with a suitable treating agent as it is fed into the trough and has a tendency of moving upwardly against end wall 20 when the trough is vibrated. As the particles of the finely divided material are granulated under the action of the spray on the fluidized material, the partially treated or untreated fines in the material continue their tendency of moving upwardly for further treatment, while the continued vibration separates the fines from the granules and moves the granulated material downwardly toward and through slot 22, taking along certain percentages of untreated material.

It has been found that substantially all untreated material is returned to the trough for granulating treatment if the inclined chute 23 is so arranged that its material supporting surface enters into the trough. For this purpose, the material removing chute is formed with an extension 27 entering the trough through slot 22 with an end portion 27a which overlaps the bottom plate of the trough. In this manner, all untreated material flows back into the vibrating trough for granulation and this after-treatment classification on the chute 23 increases the efficiency of the granulator assembly substantially to 100% in a single pass.

Further improvement has been obtained when the chute angle was adjusted at some angle less than the angle of the granular trough, for which purpose the chute may be pivoted to the granulator so that it may be simply raised or lowered to adjust its angle. In the illustrated embodiment wherein the trough has an inclination of 25°, the chute may be adjusted, for instance, to an angle of 20° to 30°, the angle of the chute being preferably generally about 2° to 5° less than the angle of inclination of the bottom plate of the granulator trough. The chute may also be integral with the trough.

The rate of production and granulation as well as the particle size of the granules depend on the bulk density of the finely divided starting material, the angle of the vibrating supporting surface, the ratio of support therefor, and the rate of treatment, i.e. the rate of feed of the finely divided material as well as the amount of treating agent impinged thereon. The angle of inclination and ratio of support of the vibrating surface have been found to be particularly important parameters in the determination of the efficiency and rate of production.

Each finely divided material has its own "angle of repose" which is the optimum angle of the vibrating surface for treating this particular material. At the angle of repose, the total throughput of granulated material is highest. We have found that the angle of inclination should be set plus or minus 1° to 3° at the angle of repose but the apparatus will operate at an angle of repose of the product plus or minus 5° to 20°. At angles of inclination considerably below the angle of repose, the finely divided material tends to be formed into larger granules than those produced at or slightly above the angle of repose.

The graph of FIG. 6 illustrates the effect of the angle of the vibrating surface on the granulation and throughput in the case of one tested product, i.e. sodium tripolyphosphate. As shown by curve A, the total throughput per hour increases roughly in proportion to the angle of inclination, the steeper the incline the higher the output. However, as curve B indicates, the total amount of granulated, i.e. effectively treated, material increases approximately in the same proportion only to a certain point in the neighborhood of the angle of repose, after which it diminishes so that the ratio of untreated material becomes rapidly larger. Curve C shows the percentage of granulated material at different angles of inclination, this percentage declining steadily with an increased incline up to a certain angle, remaining more or less unchanged for a range of about 5° and then declining rather rapidly as the incline becomes steeper. The angle of repose, i.e. the highest output of granulated material, will be found at an angle of inclination high enough to give a good total throughput but not so high as to diminish the percentage of granulated material in the total throughput seriously. At this point, the total unit output of granulated material will be highest.

Figure 7:
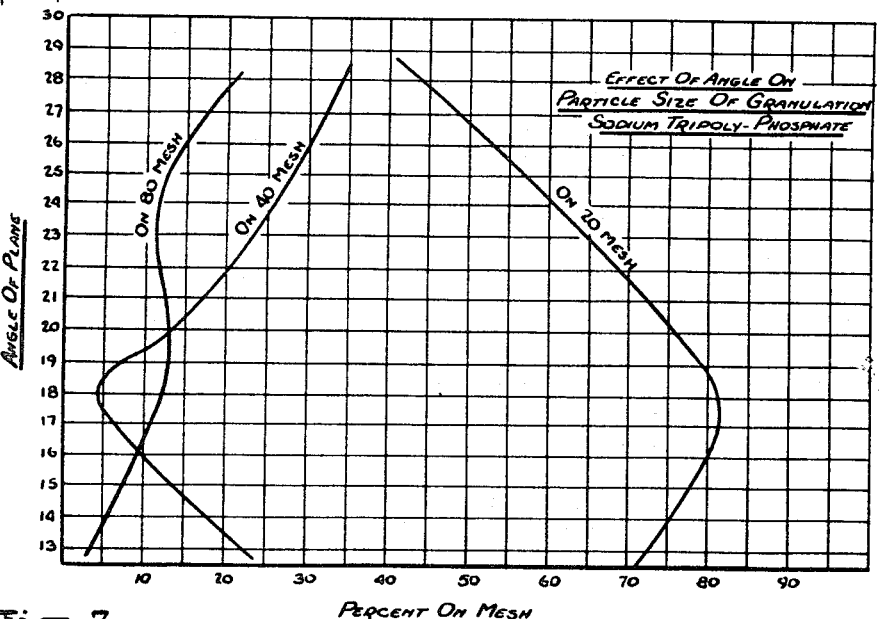
FIG. 7 is a graph showing the effect of the angle on the particle size of the granulated material.
Figure 8:
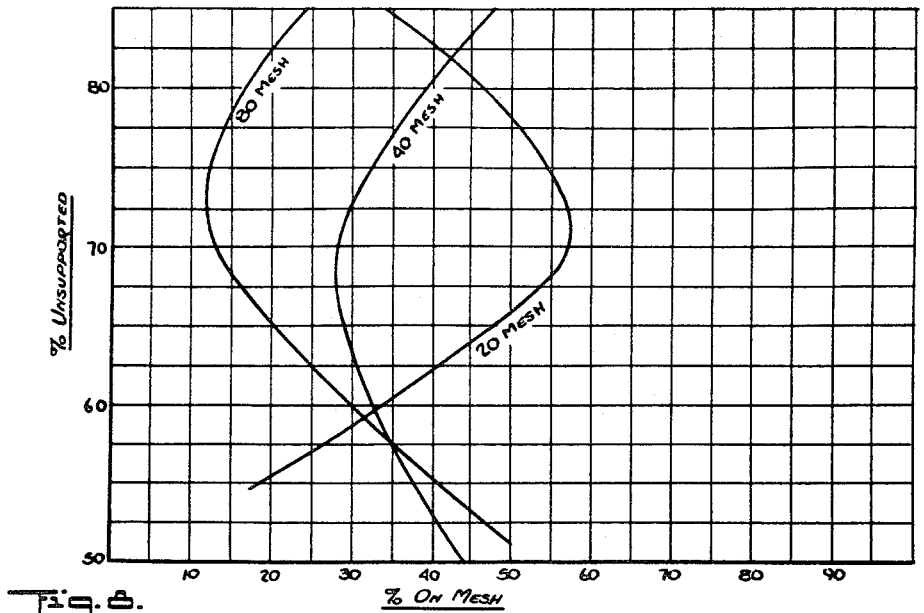
FIG. 8 is a graph showing the effect of the ratio of support for the granulator on the particle size of the granulated material.

FIG. 7 illustrates the effect of the angle α on the particle size of granulation, sodium tripolyphosphate having again been chosen as the test material. The graph of FIG. 8 shows that the ratio of the unsupported portion of the vibrating supporting surface also has an effect on the particle size of the granules.

Figure 9:
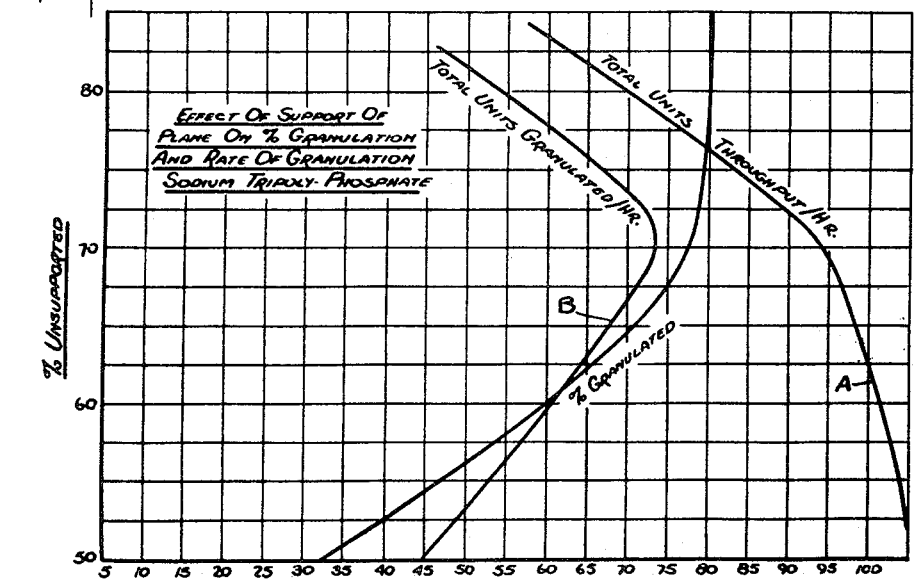
FIG. 9 is a graph showing the effect of the ratio of support for the granulator on the rate of granulation.

FIG. 9 shows the effect of the support of the vibrating supporting surface operated at the angle of repose for sodium tripolyphosphate. As shown by curve A, the total throughput decreases with an increased portion of the surface being unsupported. The output of granulated material increases at first with an increase in unsupported vibrating area until it reaches a maximum point at about 70% of the surface being unsupported, after which it declines rather rapidly. The percentage of granulated material in the total throughput increases steadily up to about said maximum point, after which it remains substantially constant. The optimum percentage of unsupported vibrating area will, of course, lie at a point where the total throughput is still fairly high and the percentage of granulated material in the total throughput is so high that the throughput of granulated material is at its highest. The objective in the free suspension of a portion of the vibrating surface is to have the surface vibrate as freely as possible so as to transfer the maximum energy from the vibrating surface into the material being vibrated.

Since, as previously explained, the untreated material flows upwardly on the inclined plane, the rate of production will also depend on the rate of application of the granulating agents and the rate of feed of the finely divided material onto the vibrating supporting surface.

It is a well known phenomenon that finely divided liquids, such as fine sprays or mists (clouds), form droplets when exposed to electrostatic charges. It is an equally well known phenomenon that non-conductive or partially non-conductive particles or materials assume electrostatic charges when rubbed together. Accordingly, the particles of the finely divided material being vibrated while sprayed presumably have electrostatic charges imparted to them. If so, they may form the spray or mist into droplets of treating agent and this theory could account for the controlled granulation of the finely divided material. The resulting granules would tend to repel each other and, thus, form readily wettable and dispersible sponge-like or porous bodies. The repelling property of the granules would still be present when they are dispersed or dissolved in a suitable liquid medium, thus removing the original tendency of the untreated finely divided material to ball up in such media.

The presence of electrostatic charges on the granules seems to be demonstrated by the tendency of the particles to spread out on the surface of the unagitated dispersing or solvent medium and to sink rapidly in a dispersed form. In the case of granulated flour, for instance, the protein remains dispersed after washing out the starch.

The treating agent impinged upon the fluidized finely divided material may be spray, mist, or vapor of any suitable agent which partially swells the particles of the material. As stated above, water is a preferred useful treating agent and may be applied, for instance, in the form or a fine mist produced by atomizing, of steam or of air saturated with water, the water may have dissolved therein wetting agents or other chemicals useful in the treatment of the particular material to be granulated. Also, aqueous treating agents may be substituted by other partially swelling agents including organic solvents, such as alcohol, acetone, acetic acid esters, and the like particularly in case of materials which are sensitive to or decomposed by water. Such non-aqueous treating agents may also be used where it is desired simultaneously to treat the material with a chemical agent which is not soluble in water but may be dissolved in such a non-aqueous agent. The nature of the treating agent will depend entirely on the treated pulverulent starting material and the desired end product, suitable reagents being chosen in each instant to obtain the desired granular composition or compound.

It is surprising to find that primarily only that portion of the finely divided material which has been converted into readily dispersible or soluble granules is progressively moved forwardly and downwardly in a thin layer toward the discharge end of the vibrating trough whence it is continuously withdrawn. The untreated or insufficiently treated material remains at the upper end of the vibrating surface or, if carried along by the treated material, at least most of it flows upwardly again and is thus exposed again to the spray or mist of the treating agent. In this manner, the vibrating surface serves not only as the granulating zone but also continuously and automatically classifies and separates at least most of the untreated from the treated material conveying the readily dispersible granules toward the discharge end while moving at least most of the untreated or insufficiently treated fines back for further treatment. Any remaining untreated or insufficiently treated particles carried by the treated granular material from the vibrating surface through the discharge outlet can be readily separated therefrom by subsequent screening since the treated granules are considerably larger than the hard-to-disperse particles.

The vibrating surface supporting the finely divided material to be treated, or at least its lower portion, may be heated, for instance by the use of infrared radiation or by other suitable means. This will eliminate condensation of moisture on the surface and the treated granules will leave the surface in dry form, thus avoiding a subsequent drying step.

Also, it has been found advantageous not only to incline the support surface but also to incline the vibrating device, for instance, electromagnet 8, so that the treated particles are repeatedly thrown upwardly and forwardly more or less in synchronism with the pulsation. The particle size and /or the apparent bulk density of the treated material may be controlled by adjusting the angle of inclination of the supported surface in relation to the vibration rate and intensity. The higher the vibration rate, the greater should be the angle of inclination.

As stated above, simple preliminary experiments permit to determine the proper angle of inclination for each material, as well as the vibration rate and intensity, the percentage of unsupported portion of the supporting surface for the finely divided material and the amount of partially swelling treating agent, for instance, of water, to be applied to produce granular material of the desired particle size, apparent bulk density, and degree of solubility or dispersibility. Rate and intensity of vibration as well as the angle of inclination also govern the classifying action of the vibrating support surface.

Although the present invention is not to be limited to any theory in respect to the effectiveness or the nature of the present invention, it is believed that the hard-to-disperse or hard-to-dissolve, solid, particulate materials are partly or superficially hydrated and thus solubilized by the treatment according to the invention. This produces free-flowing and dust-free granular products which can be rapidly and readily dispersed and/or dissolved in water or other suitable liquid media, yielding solutions or dispersions of about the same physical properties as the untreated material.

While the invention is applicable to a great variety of finely divided materials which are hard to disperse and/or present a dust problem and/or resist free flow, it has been found that it is particularly valuable in the preparation of readily dispersible sodium carboxy methyl cellulose.

Sodium carboxy methyl cellulose is a material which is widely used to provide stability in such products as ice cream, tooth paste, cosmetics, and others. It is, however, extremely hard to disperse. In ice cream products, for instance, where it is used at levels of approximately 0.17%, present commercial practice requires that sodium carboxy methyl cellulose be admixed with large quantities of sugar and other materials before being introduced into the ice cream mix to prevent balling up and to aid its dispersion in the mix. In spite of such admixtures complete dissolution or dispersion of the heretofore available sodium carboxy methyl cellulose still causes considerable difficulties and requires excessive time. It is evident that a reduction in time of dissolution of the sodium carboxy methyl cellulose is of considerable importance and will simplify the manufacture, for instance, of ice cream and the like products.

When proceeding according to the present invention, sodium carboxy methyl cellulose is converted into a product which is almost instantaneously dispersed in water. The ice cream level of 0.17% is reached within less than three minutes when operating at room temperature. Under the same conditions presently commercially available sodium carboxy methyl cellulose is dissolved to less than about 0.015% within three minutes and, even after 12½ minutes shows a solubility of 0.05% only. It is also very desirable to have sodium carboxy methyl cellulose in a readily dispersible form, for instance, when it is necessary to stabilize mixtures, such as quiescent water ice, instant salad dressings, and the like at room temperature without heating. No agglomeration and balling together of the individual particles of the treated sodium carboxy methyl cellulose is observed. The particles remain separate from each other and have a repellent action upon each other.

Even when adding the treated material in large amounts and at once to water, it was found that dispersion takes place very readily because the individual particles repel each other and, therefore, are very quickly separated from each other. In contrast thereto, the particles of untreated material have a tendency of attracting each other and, due to such attraction, to agglomerate and form lumps which cannot be brought in solution. As a result thereof the outside of the lump formed by such agglomeration is converted into a coherent gel which prevents water from penetrating into the interior of the lump and from contacting the inner particles thereof. The outer gel forms a shield-like protective coating around the particles and makes penetration of water into the interior particles of the lump impossible. In contrast thereto, the material, treated according to the present invention, cannot form such a gel-like protective coating around any lump which might have been formed on adding the material to water because the individual particles located at the outside of the lump are detached therefrom on account of their repelling power. Thus, a new surface of undissolved or undispersed particles is continuously exposed to the action of water.

The amazing increase in dispersibility, for instance, of sodium carboxy methyl cellulose at 23° C., i.e. at ambient temperature, is shown in the graph of FIG. 10. Curve A indicates that the sodium carboxy methyl cellulose granules obtained by the present invention form an 0.17% solution required in ice cream within about one minute. After 15 minutes, an 0.45% level is reached while curve B shows the solution to be about 0.06% after this period of time. It takes well over an hour of strong stirring to reach the ice cream level with commercially available sodium carboxy methyl cellulose.

The dry sodium carboxy methyl cellulose treated according to the invention has a greatly reduced apparent bulk density. For instance, when treating sodium carboxy methyl cellulose with an apparent bulk density of 0.6 according to the present invention with water to cause partial hydration, its apparent bulk density is reduced to 0.26, i.e. it is reduced more than 50%. Likewise, other materials treated with water according to the present invention have also a considerably reduced bulk density.

Although the thus treated sodium carboxyl methyl cellulose and the like material is readily dispersible in water and does not require the presence of a wetting agent, it might occasionally prove of advantage to prepare a material containing a wetting agent in order to uniformly distribute such an agent through the resulting solution or dispersion of the treated material. For this purpose it has proved of advantage to dissolve the wetting agent in the water with which the difficultly dispersible material is sprayed or otherwise treated.

It is understood that other chemical agents than wetting agents may be added to the aqueous hydrating agent used for treating such materials. For instance, deodorizing agents, perfumes, and masking agents, dyestuffs, and others may be added thereto and the material may be sprayed or otherwise treated with such aqueous solutions.

The following examples serve to illustrate the present invention without, however, limiting the same thereto.

Example 1

A small vibrating trough with a flat pan trough bed dimension of 3" x 18", for instance, a small vibratory feeder with an ampere input of 0.7 A., and a power consumption of 20 watts it set at an angle of about 25°. Said vibratory feeder has been redesigned as described hereinabove and illustrated in the attached drawings. Sodium carboxyl methyl cellulose which is hard to disperse is continuously supplied to the upper end of the trough and is subjected on said vibrating trough to pulsating vibrations (3600 vibrations per minute and 1/32" stroke). A fine mist of water is applied to the vibrating mass of material approximately at the upper end of the trough at the rate of 3.2 pounds per hour for 29 pounds of sodium carboxy methyl cellulose fed per hour to the apparatus. Thereby, the difficultly dispersible particles absorb a certain amount of water and are converted into discrete granular particles of sponge-like structure which freely flow downwardly on the trough to its lower end. The treated material is continuously withdrawn from the trough through a slot provided in the lower closed end thereof. Most of the untreated or insufficiently treated material flows upwardly in the trough so that it piles up against its closed upper end. It is, thus, again exposed to the action of water until it has absorbed sufficient amounts of water so that it moves downwardly toward the lower end of the trough. The output of treated material can be increased or decreased depending upon the angle of inclination of the trough. While the starting material passes a 60 mesh screen, only about 10% of the treated material discharged from the apparatus passes such a screen and is returned to the process as insufficiently treated material carried along by the treated material. 90% of the material is obtained in a readily dispersible form and of a particle size such as to pass completely through an 8 mesh screen. It is dried to a moisture content of 5%, i.e. the normal moisture content of commercially available sodium carboxy methyl cellulose.

The material thus prepared is readily dispersible in hot or cold water. For instance, 1% aqueous solutions are prepared at 70° C. within less than 3 minutes while the starting material requires more than one hour.

In the above example, the ratio of unsupported trough length to supported trough length was 3:2¾. When about 90% of the trough remained unsupported, the production rate increased to 30 lbs./hour.

At the same angle of incline, rate of feed and intensity of vibration, a 70% unsupported 3" x 18" trough produced at the same rate as a 16% unsupported 12" x 24" trough, i.e., a trough with a treating surface more than five times as large. When the unsupported vibrating end of the trough was extended until a total of 53% of the total supporting surface was unsupported, the 12" x 24" trough produced four to five times as much granulated material as the 3" x 18" trough.

When the angle of incline of the trough was reduced under the same operating conditions as given in the above example, the production rate dropped to 12 lbs./hr. Reducing the stroke of vibration to 1/64", with the angle of incline being 25° and all other operating conditions remaining unchanged, reduced the production rate to 9 lbs./hr., the water rate being 1 lb./hr.

The readily dispersible sodium carboxy methyl cellulose according to the present invention differs from the starting material by its low apparent bulk density which is about 0.26 while that of the starting material is about 0.6. The individual granular particles of the new readily dispersible material have a sponge-like structure and are non-crumbling and free-flowing. They are compressible by a slight pressure, for instance, by manual pressure and, when slightly compressed, readily return to their initial sponge-like structure. Each granular particle has sufficient strength to stand up without crumbling during handling. Exposure to a high pressure or grinding destroys their ready dispersibility and reconverts the particles into the difficultly dispersible starting material. The viscosity of aqueous dispersions prepared from such a readily dispersible sodium carboxy methyl cellulose is approximately the same as that of dispersions of the untreated starting material of the same concentration. Neither stabilizing power nor the other chemical and physical properties of the sodium carboxy methyl cellulose are substantially affected by the treatment according to the present invention.

Example 2

The starting material, apparatus, and procedure are substantially the same as those used in Example 1. However, in place of a spray of cold water, there is applied warm air of a temperature of about 45° C. which is saturated with water vapor, to the sodium carboxy methyl cellulose. While the output, when proceeding in this manner, is somewhat lower than when proceeding according to Example 1, the danger that too much water may be supplied to the material and that the particles may become too moist and, thus, stick to the walls of the trough, is considerably reduced. The resulting readily dispersible sodium carboxy methyl cellulose has about the same properties as the product obtained according to Example 1.

Example 3

When proceeding as described hereinabove in Example 1, but using, in place of sodium carboxy methyl cellulose, pulverized Irish Moss extract, a granular, free-flowing, non-crumbling material of sponge-like structure is obtained which has a lower specific bulk density and which is much more rapidly dispersible in water than the starting material while its other physical and chemical properties are substantially unchanged. The treated material, when added to water, does not lump or ball up. On the contrary, the individual granules immediately separate from each other on contact with water so that no agglomeration takes place.

Example 4

The usually hard to dissolve boric acid is supplied to the vibrating trough set at an angle of 19°. The vibration rate is 3600/min. and the length of stroke 1/64" and more. A water spray is applied to the boric acid in the upper and higher end of the trough. The treated readily soluble acid is continuously withdrawn from the lower end of the trough at a rate of about 8.25 pounds per hour. About 0.37 lb. of water per hour corresponding to 4.7% are added to the material. The apparent bulk density of the material is reduced from 0.43 to 0.32.

The treated material has lost all tendency to float and ball up. It sinks immediately when added to water and the time required to produce a 3% solution is reduced from 9 minutes 16 seconds for the regularly available boric acid to 2 minutes 12 seconds for the readily soluble sponge-like particles of the treated material.

The solubilizing apparatus, when set at the 19° angle and vibrated at 3600 vibrations per minute and 1/64" stroke, produced 8.25 pounds per hour. Increasing the angle of inclination and lengthening the stroke permits an increase in the rate of production. Approximately 97% of the treated material was made readily soluble in one pass through the apparatus.

The particle size of the untreated boric acid is such that 100% thereof pass a 60 mesh screen, while of the treated material 100% pass an 8 mesh screen and 0% the 60 mesh screen.

Example 5

The polyacrylamide material sold under the trademark "PAM 200" which is exceedingly hard to disperse and which passed a screen of about 100 mesh is run through the machine employed in Example 1 (rate of vibration: 3600/min.; length of stroke: 1/32"). It is sprayed with water at the rate of about 3.7 lbs. per hour corresponding to about 12% of the material fed into the apparatus. The machine is set at an angle of 28° and the output is approximately 30 pounds per hour. The material is fed in at the upper end and is continuously withdrawn from the lower end.

The material thus treated in accordance with the present invention is readily dispersible in water and does not ball up or stick to the agitator. At 75° C. the time required for producing a 1% solution is reduced from 41 minutes for the regularly available material to 6½ minutes for the readily dispersible material, produced in accordance with the present invention. Approximately 95% of the material is rendered readily dispersible.

Example 6

Karaya gum is rather difficult to disperse in water. It is rendered readily dispersible by supplying such karaya gum of a particle size passing a screen of about 100 mesh, to the apparatus used in Example 1 (rate of vibration: 3600/min.; length of stroke: 1/64") at the rate of 8 pounds per hour. The machine is set at an angle of about 17°. The resulting readily dispersible material to which 1.3 lbs. per hour of water corresponding to about 16.2% water has been added, is withdrawn from the apparatus and screened on a 60 mesh screen. All the material (94.3%) remaining on the 60 mesh screen is readily dispersible. After drying to the moisture content of about 5%, the dispersing time of the dried karaya gum is required to 5 minutes for producing a 2% solution. In contrast thereto, the regularly available material is not completely dispersed within one hour. The bulk density is reduced by this treatment from 0.66 to 0.25.

In the same manner as described hereinabove in Examples 1 to 6, there are converted the following materials into readily dispersible, granular, free-flowing non-crumbling materials of sponge-like structure and of a lower specific bulk density and of more rapid dispersibility than the starting material:

other water soluble cellulose ethers, such as cellulose methyl ether, cellulose ethyl ethers of a degree of ethylation between about 0.5 to 1.3, hydroxy ethyl cellulose, methoxy ethyl cellulose and others;
other vegetable gums, such as tragacanth, locust bean extract, gum arabic, guar gum, psyllium seed husks, oat gum, mesquite gum, Indian or Ghatti gum, Sterculia gum, and others;
pectins, starch, such as cornstarch, rice starch, and other starches, dextrins, dextrans, sodium alginate, agar, and the like carbohydrate-like materials;
water-soluble or dispersible plastic materials, such as polyvinyl pyrrolidone, and others;
foodstuffs, such as whole wheat flour, corn flour, rice flour, and other types of flour;
cocoa, malted milk, milk powder, egg powder, and others;
inorganic materials, such as lime, fertilizers, and others.

EXAMPLE 7

Whole wheat flour is treated with water by following the procedure described in Example 1. Thereby, a material is obtained which is very readily dispersed in water and facilitates rapid and complete washing out and separation of the starch from the other constituent of the wheat grain and epecially from albumen and gluten. The process according to the present invention very considerably reduces the time ordinarily required for washing out the starch grains and surprisingly leaves the other constituents in a dispersed form, which dispersed form does not result when using wheat flour which has not been subjected to a preliminary water treatment with simultaneous vibration according to the present invention.

Corn flour, rice flour, and other flours can also be subjected to a water treatment according to the present invention in order to facilitate subsequent recovery of corn starch, rice starch, and the like starches therefrom and to leave the other constituents in a dispersed form.

EXAMPLE 8

When proceeding as described hereinabove in Example 1, but using, in place of sodium carboxy methyl cellulose, the acid azo dyestuff sold under the trademark "Fast Red S. conc." by the firm National Aniline Division of Allied Chemical and Dye Corp., New York, a granular free-flowing, non-crumbling material of sponge-like structure is obtained which has a lower specific bulk density and which is much more rapidly dispersible in water than the starting material while its other physical and chemical properties are substantially unchanged. The treated material, when added to water, does not lump or ball up.

On the contrary, the individual granules immediately separate from each other on contact with water so that no agglomeration takes place.

Other difficultly dispersible organic and inorganic dyestuffs and pigments are also converted into readily dispersible, non-agglomerating form when subjected to a treatment with water as described hereinabove in Example 8.

The dusting of dyes and pigments normally presents a problem in their commercial handling. The granular, free-flowing, non-crumbling material of sponge-like structure which is produced by the process described hereinabove, greatly reduces this problem of commercial handling and is of, at least, equal importance with respect to its rapid dispersibility in water or other media.

EXAMPLE 9

When proceeding as described hereinabove in Example 1, but using, in place of sodium carboxy methyl cellulose, pulverized pectin of N.F. grade of a particle size substantially completely passing a 100 mesh screen, a granular, free-flowing, non-crumbling material of sponge-like structure is obtained the specific bulk density of which is much lower than that of the starting material and which is very readily dispersible in water and does not agglomerate or ball up on contact therewith. Its other physical and chemical properties remain substantially unchanged thereby.

As stated hereinabove, the procedure according to the present invention may also be employed to render materials more readily dispersible in other dispersing agents than water. For this purpose, for instance, a treatment with alcohol with simultaneous vibration causes benzoic acid to become more readily dispersible in alcohol or other organic solvents compatible with alcohol. Likewise, cellulose acetate, when subjected to a treatment with aqueous acetone with simultaneous vibration becomes more readily dispersible in organic solvents.

The following tests were carried out under the given conditions on the particulate materials listed hereinafter in Table I.

A Syntron vibrating feeder (Model F-O) was used as the granulator and a Jeffrey vibrating feeder to meter the powder continuously to the upper end of the granulator. The granulating solutions were sprayed with a Burgess vibrating pump sprayer suspended about three feet above the discharge end of the granulator. The lower three-fourths of the granulator was covered with a sheet of polyethylene to keep it dry during the runs, and a metal baffle with a gutter was hung in front of the discharge of the feed conveyor.

Before starting a run with a new material, a small amount of the untreated powder was placed dry on the upper end of the granulator, with the granulator power on. The slope of the granulator was raised until the powder just started to slide off. The initial runs with the material were made with the granulator at this slope. The slope of the granulator and the power input were held constant during each run. The granulator operation was controlled primarily by the solution spray rate and secondarily by the powder feed rate. The criterion for regulation of the water spray and the powder feed rate was the size of zone of untreated powder on the upper end of the granulator. If the zone got too large, the water spray rate was increased and then, if necessary, the powder flow rate was decreased.

For most products tested, granulation was carried out at a number of different slopes. The average product particle size can usually be increased to some extent by lowering the slope but only at the expense of a substantial decrease in throughput. For any product, there is a fairly narrow range of permissible slopes. If the slope is too steep, most of the powder slides off the conveyor untreated. If the slope is too shallow, the aggregates become too wet to roll out of the spray zone. The difference between the maximum and minimum slopes for any product is usually about 10°.

TABLE I

| Product | Spray Solution | Granulator Angle, degrees | Bulk Density Before | Bulk Density After | Rate, g./hr. |
|---|---|---|---|---|---|
| PAM 200 (regular production grade) | Water | 33 | 0.54 | 0.44 | 1,850 |
| Auramine | Water containing 1½% of CMC. | 29 | 0.51 | 0.48 | 420 |
| Orange II | Water containing 1½% of CMC and 10% dedusting oil. | 30 | | | 750 |
| Homo-Fuchsine | Water | 25 | | | 230 |
| Cymel 405 (melamine-formaldehyde resin) | do | 35 | 0.86 | 0.60 | 710 |
| Parex 607 (melamine-formaldehyde resin) | do | 35 | | | 500 |
| Citric Acid | do | 23 | 0.96 | 0.80 | 1,810 |
| Mixture of 75% sucrose and 25% starch | do | 25 | | | 360 |
| Mixture of 50% pathilon ethochloride and 50% dicalcium phosphate. | do | 25 | | | 700 |
| Dicalcium phosphate | 10% gum acacia | 25 | | | 650 |
| Titanium dioxide | 89% glycerol | 25 | 1.11 | 1.11 | 1,450 |
| Products sold by the firm Morningstar-Paisley: | | | | | |
| Guar gum (G-1) | Water | 20 | | | 2,500 |
| G-2 (guar gum) | do | 26 | | | 2,300 |
| G-K (guar-karaya gum) | do | 25 | | | 1,900 |
| T-1 (tapioca) | do | 25 | | | 1,250 |
| T-3 (tapioca) | do | 25 | | | 1,250 |
| T-4 (tapioca) | do | 25 | | | 1,200 |
| A-10 (gum arabic) | do | 19 | | | 3,150 |
| C-2 | do | 25 | | | 1,200 |
| C-3 | do | 25 | | | 1,150 |
| K-IR | do | 28 | | | 1,300 |
| LB-2 (locust beam gum) | do | 20 | | | 3,200 |
| TEND 1 (large particles) | do | 14 | | | 500 |
| TEND 2 | do | 32 | | | 2,700 |
| "REDIJEL 78D" | do | 32 | | | 1,520 |
| "REDIJEL 78D" | Water-alcohol | 32 | | | 1,450 |
| "REDIJEL 4" | Water | 33 | | | 1,550 |
| "REDIJEL F-13" | Water-alcohol | 30 | | | 1,500 |
| Products sold by the firm Rohm & Haas: "HYAMINE 1622." | Water | 23 | | | 3,500 |
| Products sold by the firm Food Mach. & Chem. Corp.: | | | | | |
| Tri-sodium tripolyphosphate | do | 23 | | | 5,500 |
| Sodium salt of di-chloro cyanuric acid | do | 31 | | | 1,225 |
| Products sold by the firm Pfister Chem. Co.: | | | | | |
| "Naphthol AS-SW" (Dyestuff) | do | 30 | | | 1,500 |
| β-hydroxy naphthoic acid | do | 32 | | | 4,100 |
| "Azoic Black OB" (Dyestuff) | do | 32 | | | 5,000 |
| β-hydroxy naphthoic acid | Water plus 0.1% of sodium carboxy methyl cellulose. | 32 | | | 4,000 |
| Products sold by Kelco Company: "KELCOSOL" (algin colloid). | Water | 27 | | | 3,500 |

A number of runs were made to determine the distribution of particle size in "run-of-the-pile" triple superphosphate granulated according to the invention and typical results are given in Table II hereinbelow. Single-pass granulation reduced the through 60-mesh fines by 60% to 79%.

TABLE II.—SCREEN ANALYSES OF TYPICAL TRIPLE SUPERPHOSPHATE RUNS

| Material | "Run-of-the-pile" Feed | Run No. 25 | Run No. 26 |
| --- | --- | --- | --- |
| Conveyor angle, degrees | | 30 | 28 |
| Granulation rate (g./hr.) | | 2,330 | 2,450 |
| On mesh: | | | |
| 6 | 0.7 | 11.5 | 7.1 |
| 12 | 11.7 | 17.4 | 17.0 |
| 30 | 30.0 | 39.0 | 38.3 |
| 60 | 26.2 | 23.6 | 24.5 |
| Through 60 mesh | 31.4 | 8.5 | 13.1 |

According to another embodiment of the present invention finely divided or pulverulent solid materials may be treated or, respectively, reacted with a liquid agent or reactant by subjecting such materials to the action of a liquid spray while the material is vibrated on an inclined plane. The finely divided, solid material treated in this manner is discharged from the treatment reaction zone in granulated, readily dispersible and dust-free form requiring no further processing, the treated granules being conveyed downwardly on the inclined vibrating plane while the untreated particles are conveyed upwardly thereon to be subsequently subjected to additional spraying.

It is also of importance that the layer or burden of material to be treated at the feed end of the vibrating device has a considerable thickness so that the sprayed treating or reacting liquid does not completely penetrate said burden of material and does not contact the vibrating surface, but merely contacts the upper layers of said burden of material. This has the advantage that it prevents a build-up of wet material on the vibrating surface. Conversely, if the burden material is wetted through and through, the material might stick to the vibrating surface thus impeding or even preventing continuous operation.

When this treatment is used to perform chemical reactions, these reactions take place in a relatively dry state, thus eliminating many costly operations in the conventional processes wherein chemical reactions are performed in a slurry which must subsequently be dried. Furthermore, the composition or compound resulting from the reaction of the solid material and liquid spray comes off the granulating zone either ready for use or only slightly moist. In conventional solution or slurry preparations, costly recovery procedures are required, such as the removal of large quantities of water or reagents, spray or drum drying, etc. and the recovery of reagents.

Certain preferred granulating conditions and equipment have been described in detail hereinabove and, while the treatment of puverulent solid material with a liquid spray in accordance with the present invention is not limited to these preferred conditions, they will be useful therein, and are, therefore, described hereinbelow in detail.

For instance, proper motion of the inclined supporting surface is an important part of this invention. For instance, the vibratory motion may be such that the angle of vibration of the vibrating surface increases from the discharge end to the feed end and this variation may be such that the angle of vibration adjacent to the discharge end is preferably near the optimum conveying angle. This angle has been found to be between about 10° and about 25° and preferably between 16° and 20°. The angle of vibration adjacent the feed end is in general between about 40° and about 60° and preferably between 50° and 55°. Good results are obtained when the amplitude of vibration is between about 1/4" and about 1/64" and preferably around 1/8". Thereby the lower amplitude, for instance, an amplitude of slightly less than 1/8", is at the discharge end while the higher amplitude, for instance, an amplitude of slightly above 1/8" is at the feed end. These variations in amplitude and direction of vibration are independent from the angle of inclination of the supporting surface. Said angle of inclination determines the thickness of the working layer or burden of the material to be treated or reacted.

The following examples serve to illustrate the reaction and formation of new compounds or, respectively, compositions by treating a great variety of finely divided or pulverulent materials with a liquid reactant without being limited thereto.

Example 10

A neutral, granular detergent composition was produced in the following manner:

A finely divided mixture of the following components, all parts being by weight, was fed onto a vibratory feeder as described hereinabove and illustrated in the accompanying drawing:

7.00% of anhydrous sodium meta-silicate,
9.00% of sodium carbonate,
22.25% of sodium sulfate,
45.00% of sodium tripolyphosphate,
0.05% of optical brightener as sold under the trademark "Colcofluor White MR new" by American Cyanamid Company,
0.20% of sodium carboxymethyl cellulose.

The flat open trough bed dimension of the vibratory device was 3" x 18", the ampere input 0.7 A. and the power consumption 20 watts. The feeder was set at an angle of 25°.

The above mixture was fed through hopper 10 (FIG. 1) and the feeder was subjected to 3600 vibrations and a transverse stroke of about 1/8". A fine spray of a 50% aqueous solution of dodecyl benzene sulfonic acid was applied to the vibrating mixture of finely divided materials at 11 (see FIG. 1) at a rate such that the mixture was treated with 15%, by weight, of the entire composition, of the detergent acid.

The sodium carbonate in the mixture acted as a neutralizer for the acid and the composition came off the feeder in commercially acceptable granular form ready for use as a detergent composition. No subsequent drying was necessary.

In the conventional production of similar detergent compositions, the sodium carbonate is replaced by sodium sulfate and the neutralized form of the detergent is put in slurry form and then spray dried. The latter steps are entirely avoided in the exemplified procedure.

Example 11

Using substantially the same equipment and conditions as in Example 10, water-soluble sodium caseinate was produced by spraying pulverulent casein with a dilute (10%) sodium hydroxide solution.

Example 12

Calcium arsenate was successfully synthesized on the equipment of Example 10 by feeding calcium carbonate to the vibrating feeder and spraying it with stoichiometric proportions of meta-arsenic acid in the form of a 75% aqueous solution. The materials were reacted simultaneously with their granulation, thus continuously producing hard, uniform, easily dispersible, and dust-free granules of calcium arsenate according to the reaction

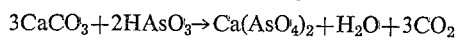

$$3CaCO_3 + 2HAsO_3 \rightarrow Ca(AsO_4)_2 + H_2O + 3CO_2$$

Example 13

Similar results as in Example 12 were obtained by continuously feeding pulverulent litharge (lead oxide) and spraying it with a stoichiometric quantity of meta-arsenic acid, in the form of a 75% aqueous solution to produce uniform, easily dispersible, and dust-free granules of lead arsenate according to the following reaction $$PbO + HAsO_3 \rightarrow Pb(AsO_3)_2 + H_2O$$

Example 14

Sodium molybdate was prepared in a like manner by feeding a mixture of 1 mole of sodium carbonate and two moles of molybdenum trioxide ($MoO_3$) to the vibrating trough and spraying the mixture with 2 moles of a dilute 10% sodium hydroxide solution. The uniform, dust-free, and free-flowing granules emerging from the trough were produced according to the following reaction $$2MoO_3 + Na_2CO_3 + 2NaOH \xrightarrow{H_2O} 2Na_2MoO_4 + CO_2 + H_2O$$

Example 15

Sodium molybdate was also prepared by feeding a stoichiometric mixture of sodium carbonate and molybdenum trioxide to the vibrating trough and spraying the mixture with water. Thereby, reaction takes place and a uniform, dust-free, and free-flowing granular sodium molybdate is obtained according to the following equation $$MoO_3 + Na_2CO_3 \xrightarrow{H_2O} Na_2MoO_4 + CO_2$$

Example 16

Sodium molybdate was prepared by feeding molybdenum trioxide to the vibrating trough and spraying said molybdenum trioxide with the equimolecular amount of a concentrated sodium carbonate solution. The resulting sodium molybdate has the same properties as the products obtained according to Examples 14 and 15.

Example 17

Another way of producing sodium molybdate consists in feeding molybdenum trioxide to the vibrating trough and sprayiny the same with a concentrated (50%) sodium hydroxide solution in an equimolecular amount. The sodium molybdate obtained thereby has the same properties as the product obtained according to Examples 14 to 16.

Example 18

Proceeding under the conditions of Example 10, the granular sodium salt of dodecyl benzene sulfonic acid was prepared by feeding sodium carbonate and spraying it with a 50% aqueous solution of the acid. The concentration of the sodium salt in excess carbonate (and/or other diluents) may be controlled by the concentration of the acid in the spray. The acid may be diluted with water, alcohol, or any other compatible solvent.

The sodium salt of the dodecyl benzene sulfonic acid was continuously produced in the form of free-flowing, dust-free granules along with the excess carbonate. The concentration of the sodium salt in the mixtures ranged from 20% to 45%. A 20% concentration was obtained with the acid concentration at 50%; a 40% concentration with an acid concentration of 75% to 80%. Higher concentrations may be obtained by increasing the acid concentration of the spray.

Example 19

Similarly, ammonium molybdate was continuously produced in granular form by spraying molybdenum trioxide ($MoO_3$) with aqueous 30% ammonia. The resultant ammonium molybdate granules were free-flowing and dust-free.

Example 20

A mixture of

7% of anhydrous sodium metasilicate
9.00% of sodium carbonate,
22.25% of sodium sulfate,
45.00% of sodium tripolyphosphate,
0.05% of optical brightener as sold under the trademark "Calcofluor White MR new" by American Cyanamid Company,
0.20% of sodium carboxymethyl cellulose in amounts of about 200 pounds per hour was fed to a pilot vibratory device. The vibrating surface of the vibrating reactor was set at an angle of 24°. At the discharge end of said vibrating reactor the angle of motion was 18° relative to the vibrating surface while at the feed end the angle of motion was about 52.5°. At intermediate points of said vibrating surface there were intermediate angles of motion. The amplitude at the discharge end was 5/64″ and the amplitude at the feed end was 9/64″. The power consumption was 7 amp. at 220 volts. The vibratory reactor was subjected to 1800 vibrations. The above mentioned mixture was sprayed on said vibratory reactor with a fine spray of a 50% aqueous solution of dodecyl benzene sulfonic acid at such a rate that about 269 pounds/hour of final detergent were produced. The amount of detergent acid sprayed onto said mixture was such that the composition contained 17% of the sodium salt of the detergent acid. The discharged detergent mixture was subsequently dried in a commercial hot air dryer and yielded 269 pounds of dry material per hour. The apparent density of said material was 0.43. The particle size was such that 100% of the material pass a mesh size of 20 while 100% thereof are retained by a mesh size of 60. The starting mixture passes 100% through 100 mesh.

Example 21

A granular sodium salt of dodecyl benzene sulfonic acid was prepared in amounts of 247 pounds per hour in the same pilot vibratory reactor by proceeding as described in Example 18. In this case a 75% aqueous solution of the acid was used. The dodecyl benzene sulfonic acid solution was heated to about 60° C. to facilitate spraying. The resulting sodium salt of dodecyl benzene sulfonic acid can be used as such. If, however, a product of a lower water content is desired, it is dried in a suitable drying apparatus. The product after drying was 43% active. Its apparent density was 0.3. The product contained an excess of sodium carbonate which serves as filler. The resulting reaction product passes to 100% a mesh size of 20 and is retained to 100% by a mesh size of 60. The starting sodium carbonate was of a particle size passing to 100% a mesh size of 100.

Example 22

Sodium molybdate was prepared according to Example 14 by reacting a mixture of sodium carbonate and molybdenum trioxide with a dilute 10% sodium hydroxide solution. The resulting sodium molybdate was dried in a suitable drying device. 144 pounds per hour of sodium molybdate were obtained. The angle of the vibrating surface was 14°, while the amplitude and the angle of direction of the vibratory reactor were the same as given in Example 20. The resulting sodium molybdate was readily dispersible and soluble in water. Its aqueous solution has a pH of 8.2. The particle size of the sodium molybdate was 100% through 10 mesh and all was retained by 100 mesh. All of the starting molybdenum trioxide and sodium carbonate passed through 200 mesh.

Example 23

In order to adjust the pH-value of sodium caseinate to a pH of about 7.0, sodium caseinate of a pH of 5.6 was sprayed with a 10% aqueous solution of sodium carbonate on the vibratory reactor described hereinabove. The reactor was set at an angle of 29°. The motion of vibration at the discharge end was at an angle of 11° and the motion of vibration at the feed end was at an angle of 63° while intermediate points were adjusted to intermediate angles. The amplitude at the discharge end was 1/16″, the amplitude at the feed end was 1/8″. The sodium carbonate solution was sprayed on the sodium caseinate in an amount of 2 cc. per minute by means of a dental type spray. The pH of the resulting sodium caseinate after subsequent drying was 7.0. The material was in granular form and readily dispersible and soluble in water.

It is interesting to note that the adjustment of the inclination of the vibrating reactor is of importance for obtaining a predetermined pH-value. For instance, when setting the angle of inclination at 27° and proceeding otherwise in the same manner as described hereinabove, the pH-value of the resulting product is 7.5. This is apparently due to the fact that at a lower angle of inclination the material remains for a longer period of time at the feed end and thus is exposed to larger amounts of sodium carbonate so that the pH-value of the resulting product is increased. In this manner it is possible by changing the angle of inclination to adjust the pH-value of the sodium caseinate to any desired value between about 5.6 and about 10.0. When replacing sodium carbonate by sodium hydroxide, the pH-value of the resulting sodium caseinate can be increased even more.

Example 24

In order to neutralize sodium molybdate which has ordinarily a pH of 10.5 to a pH of about 7.0, the sodium molybdate is placed on the vibratory reactor described hereinabove and is sprayed with a 10% acetic acid solution. The apparatus is set at an angle of inclination of 32°, while the angles of vibration, the amplitude, and the frequency are the same as in Example 23. The resulting sodium molybdate discharged from the discharge end has a pH of 6.9. It is readily dispersible and soluble in water.

When using a 5% acetic acid solution for spraying the sodium molybdate, while otherwise the conditions are the same as described before, the pH of the resulting treated sodium molybdate is 7.3. It is evident that the process according to the present invention can be used for neutralizing or adjusting the pH-values of many other materials than those mentioned hereinabove, in a simple and effective manner by adjusting the angle of inclination and the other characteristics.

Example 25

Wheat gluten in pulverulent form was placed on the vibratory reactor according to the present invention. The angle of inclination of said reactor was 18°. Otherwise the conditions were the same as in Examples 23 and 24.

The wheat gluten was sprayed with a 37% hydrochloric acid solution. The discharged treated material was dried. The dried material was obtained in granular form of increased water-solubility. 2.0673 g. of said finished product were placed into water and the pH of the resulting dispersion was 7.0. The resulting dispersion was then titrated with sodium hydroxide solution to a pH of 7.3 whereby 19 cc. of N/2 sodium hydroxide solution were used. In contrast thereto a suspension of the same amount of untreated gluten required only 2 cc. of N/2 sodium hydroxide solution. This proves that the gluten had taken up and was combined with a considerable amount of hydrochloric acid.

When filtering the resulting solution of a pH of 7.3, the filtrate was concentrated and the concentrated solution was adjusted to a pH of 3.2. Thereby crystals of glutamic acid separated and were filtered off. This indicates that apparently a partial hydrolysis of the wheat gluten was achieved on treatment with hydrochloric acid on the vibratory reactor according to the present invention.

In a similar manner wheat flour can also be treated with hydrochloric acid. Likewise, hydrochloric acid can be replaced by aqueous solutions of nitric acid.

Example 26

The apparatus was the same as used in the preceding Examples 24 and 25. The angle of inclination was about 16°. Chloro acetic acid was placed upon the feed end of the vibratory reactor and was sprayed with a concentrated ammonia solution. A reaction took place as was evidenced by the generation of ammonium chloride vapors and the reaction product travelled downwardly the inclined surface of the reactor. The resulting reaction product proved to be $\alpha$-amino acetic acid, which is slightly soluble in water and insoluble in ether, in contrast to chloro acetic acid which is insoluble in water and soluble in ether. The melting point of the reaction product was between 230–239° C., also indicating that a reaction had taken place.

Example 27

Paraformaldehyde was placed on the upper end of the vibratory reactor and was sprayed with a solution of 50% phenol, 45% of isopropanol, and 5% of water containing about 0.25% of aqueous concentrated ammonia solution as catalyst while vibrating the reactor in the same manner as described in the preceding example. The angle of inclination was 22°. A granular reaction product was withdrawn from the lower end of the reactor. When subjecting said granulated material to the action of infrared light, the granules gradually change into a brown resinous mass representing a resinous phenol formaldehyde condensation product.

Example 28

The vibratory reactor as described hereinabove can also be used for producing acid addition salts, for instance, of amino acids. When placing glutamic acid upon the upper part of the vibratory reactor and spraying the same with an aqueous solution of hydrochloric acid, while vibrating, the water-soluble hydrochloride of glutamic acid is obtained in the granulated state. It is readily water-soluble. The angle of inclination of the vibrator was 22°.

Example 29

When reacting benzoic acid on the vibratory reactor according to the present invention and as described in the preceding examples with a bromine-containing solution of hydrobromic acid, while exposing the benzoic acid to the heat produced by infrared light, a reaction takes place and the resulting reaction product discharged from the lower end of the apparatus has a melting point of 153–156° C., thus indicating that benzoic acid has been converted into bromo benzoic acid. The angle of inclination of the reactor was 14°.

Example 30

The apparatus and the procedure is the same as described hereinabove, whereby, however, benzoic acid was sprayed with a mixture of 25% of nitric acid containing 1% of sulfuric acid. The resulting reaction product discharged from the apparatus had a melting point of 140–141° C., thus, apparently, representing m-nitro benzoic acid.

The reaction was carried out while heating the benzoic acid by exposure to infrared light. The angle of inclination was 14°.

It will be self-evident from the above examples that numerous compounds and compositions may be produced most economically with the process of the present invention. Any chemical substance or mixture of such substances which may be treated or reacted in a finely divided or pulverulent state with a liquid agent may advantageously be so treated in accordance with this invention. The liquid spray may be a concentrated or dilute form of the desired treating agent or a mixture of such agents and, if desired, may be dissolved in any suitable and compatible solvent. Also, if this is desirable in the specific chemical reaction, a catalyst or catalysts may be incorporated either in the treated material or in the liquid treating agent, or both.

Generally speaking, the treatments or reactions contemplated by the present invention may be divided into two major groups.

Group I is illustrated by the reaction $$A+B \to C+D$$

In this reaction, A is treated with B to obtain C, with D as a by-product. It is the object of this reaction to obtain C in as pure a form as possible, without further refining or after-treatment. Therefore, it is essential that D be a volatile substance which may be removed on drying, or a gas which will be evolved during the treatment. The following reactions illustrate this group:

| A | B | C | D |
|---|---|---|---|
| (a) $MoO_3$ + $Na_2CO_3$ (and $H_2O$) | $\to$ | $Na_2MoO_4$ + $CO_2$ | |
| (b) $CaO$ + $H_2SO_4$ | $\to$ | $CaSO_4$ + $H_2O$ | |

In all reactions of this type (Group I), the purity of C will depend on the purity of the pulverulent material A and the liquid treating agent B.

Included in this type of reaction is the treatment of solid metal oxides, carbonates, and hydroxides with suitable acids or their solutions to produce granular acid salts. The metal may be, for instance, any alkali metal or alkaline earth metal. The acid may be a mineral acid, such as sulfuric, phosphoric, or nitric acid, or an organic acid, such as acetic, citric, oxalic, propionic, tartaric aid, or the like, depending on the desired reaction and end product. The materials and treating agents are listed merely by way of example and in no way limit the invention.

Other possible reactions include the production of free-flowing, granular metal salts by spraying the corresponding finely divided metal with a suitable acid. Granular salts such as tartrates, citrates, oxalates, and others may also be formed by spraying solid pulverulent organic acids with suitable liquid reagents, such as ammonia, alkali metal hydroxides, amines, and the like.

Another group of reactions (Group II) includes treatments wherein the by-product D also is a solid. An example of this group is the neutralization of α-amino acid hydrochlorides, for instance, from wheat gluten, and other hydrochlorides with alkali metal hydroxide solution in accordance with the following equation $$R.NH_2.HCl + NaOH \to R.NH_2 + NaCl + H_2O$$

In another embodiment of the present invention the vibrating trough may be enclosed so that reactions may be carried out, if desired, in a vacuum, under pressure, in an inert atmosphere, for instance, under nitrogen, or in a reducing or oxidizing atmosphere. Operation, at a temperature below room temperature or at elevated temperature is also possible. It is, of course, also possible to use a cooled or heated liquid reactant in order to effect reaction with the vibrating other reactant. It is, of course, understood that, when the reaction proceeds rather slowly, the length of the vibrating trough must be adjusted to the speed of reaction or that the material is passed through several vibrating troughs.

Further examples of reactions which may be carried out according to the present invention are, for instance:

(a) The reaction of solid organic carboxylic acid halogenides or sulfonic acid halogenides with liquid amines or with solutions of such amines to yield the respective acid amides, such as the reaction of p-acetamino benzene sulfonylchloride with ammonia or amines to yield the respective acetyl sulfanilamides.

(b) The replacement of halogen in reactive halogenated organic compounds by the amino group by treating such compounds with ammonia or amines, if required, in solution in suitable solvents, for instance, the preparation of α-amino-n-caproic acid from α-bromo caproic acid and concentrated ammonia solution.

Another example is the preparation of β-bromo ethyl phthalimide by reaction of potassium phthalimide with ethylene dibromide.

(c) The replacement of halogen in reactive halogenated organic compounds by the nitrile group, such as the reaction of cuprous cyanide with allyl bromide to yield allyl cyanide.

(d) The reduction of organic compounds, for instance, by admixing to the compound to be reduced a metal powder and then treating the mixture with an acid while vibrating.

(e) The preparation of salts of acids with inorganic and organic bases. Examples of this reaction are given hereinabove. The reaction is useful, for instance, in the preparation of aniline arsenate from arsenic acid powder and aniline. Said aniline arsenate is the starting material for arsanilic acid.

(f) The formation of Schiff bases by reacting liquid carbonyl compounds or solutions thereof with solid amino compounds, if necessary, with the simultaneous addition of acid or alkaline condensing agents.

(g) The formation of carboxylic acid anhydrides by reacting the solid carboxylic acid with the liquid carboxylic acid chloride or with acetic acid anhydride. This reaction proved useful in the preparation of benzoic acid anhydride.

(h) The formation of esters of organic carboxylic or sulfuric acids by reacting the solid alkali metal or silver salts with a reactive halogenated compound. For instance, benzyl benzoate is prepared from sodium benzoate and benzylchloride.

(i) The preparation of epoxides from the corresponding 1-hydroxy-2-halogen compounds by reaction with an alkali metal hydroxide solution.

(j) The halogenation of organic compounds by reacting the solid organic compound, for instance, with bromine or with solutions of the halogen in organic solvents, such as the bromination of anthracene to 9,10-dibromo anthracene by reaction with a bromine solution in carbon tetrachloride.

These reactions, of course, are not intended to limit the present invention thereto. Considerable advantages and reduction in expenses are achieved in all reactions of solid materials with liquid reactants.

The following examples serve to further illustrate the present invention and especially to show the application of the resent invention to the process of simultaneously producing a dry material in granulated form from a solution of said material.

Example 31

The apparatus and the procedure is the same as described hereinabove in Example 1, but using, in place of sodium carboxy methyl cellulose, pulverized methyl dodecyl benzyl trimethyl ammonium chloride sold under the trademark "Hyamine 2389" by Rohm & Haas of Philadelphia, Pa., of a particle size substantially completely passing a 100 mesh screen. A burden of such a material is fed to the feed end of the vibrating device. This burden of material is sprayed with a 50% aqueous solution of methyl dodecyl benzyl trimethyl ammonium chloride. Such spraying causes the material to granulate and said granules which have absorbed about 20% of their weight of moisture move downwardly toward the discharge end where they are subjected to increased temperature, for instance, by means of an infrared light lamp. About 20% of the dry discharged granulated material are collected as finished product while about 80% thereof are pulverized to pass a 100 mesh screen and are returned to the feed end of the apparatus, where they are again sprayed with the 5% solution of the starting material. In this manner it is possible to completely convert an aqueous solution of the starting material into a dry granular product.

In place of the above mentioned quaternary ammonium compound "Hyamine 2389," there may be used other quaternary ammonium compounds as they are employed as detergents, bactericides, and for other purposes.

Example 32

The apparatus and the procedure is the same as described hereinabove in Example 1, but using, in place of sodium carboxy methyl cellulose, pulverized sorbitol and spraying the sorbital burden with a 70% aqueous solution of sorbitol. Thereby, the dissolved sorbitol is converted into dry granular form.

In place of sorbitol, other solid polyhydric alcohols or carbohydrates such as sucrose and, in general, all materials forming with water, or a liquid, a liquid mixture of a low eutectic point which can be evaporated to dryness and granulated only with great difficulty and by means of complicated apparatus, can be subjected to the claimed process to yield dry granular products.

As stated above, other apparatus with a vibrating inclined plane than those described hereinabove may be used to carry out the process according to the present invention. Such apparatus may have a fully supported vibrating inclined plane provided that said inclined plane is so arranged with respect to its angles and amplitudes of vibration that the starting material or any incompletely treated material is substantially continuously maintained at the upper or feed end of said plane while the fully treated material flows continuously to and is discharged from the lower end of said plane. This may be achieved, for instance, by having the feed end of the plane exposed to stronger vibration than the discharge end and/or by providing a steeper angle of vibration at the feed end than at the discharge end of such an apparatus.

Of course, many changes and variations in the difficultly dispersible starting materials and treating agents used, in the amounts of water or other treating agents employed and in the manner in which such water or treating agents are applied to the starting materials, in the particle size of the starting materials, in the rate of vibration, length of the stroke, angle of inclination, temperature, and other reaction conditions under which water or treating agent is applied to the starting material, in the manner in which the treated material is worked up and separated from untreated material, and the like may be made by those skilled in the art in accordance with the principles set forth herein and in the claims annexed hereto.

We claim:

1. In a process of converting difficultly dispersible particulate, substantially solid materials into readily dispersible form, the steps which comprise subjecting the particulate, difficultly dispersible substantially solid material to pulsating vibration while on an inclined plane, exposing the vibrating material to the action of a finely divided spray of a liquid agent causing swelling of the material, the angle of inclination being such that the untreated material, due to said pulsating vibration, moves upwardly on said inclined plane, while the treated readily dispersible material moves downwardly thereon, and removing the absorbed swelling agent from the resulting treated material.

2. In a process of converting difficultly dispersible sodium carboxy methyl cellulose into readily dispersible form, the steps which comprise subjecting granular, difficultly dispersible sodium carboxy methyl cellulose to pulsating vibration while on an inclined plane, exposing said vibrating sodium carboxy methyl cellulose to the action of a finely divided water spray in an amount sufficient to cause superficial hydration of the particles thereof, the angle of inclination being such that the untreated material, due to said pulsating vibration, moves upwardly on said inclined plane, while the treated readily dispersible material moves downwardly thereon, and drying the resulting treated sodium carboxy methyl cellulose to remove absorbed water therefrom.

3. In a process of converting difficultly dispersible water soluble cellulose ethers into readily dispersible form, the steps which comprise subjecting a granular, difficultly dispersible water soluble cellulose ether to pulsating vibration while on an inclined plane, exposing said vibrating cellulose ether to the action of a finely divided water spray in an amount sufficient to cause superficial hydration of the particles thereof, the angle of inclination being such that the untreated material, due to said pulsating vibration, moves upwardly on said inclined plane, while the treated, readily dispersible material moves downwardly thereon, and drying the resulting treated cellulose ether to remove absorbed water therefrom.

4. In a process of converting a difficultly dispersible particulate vegetable gum into readily dispersible form, the steps which comprise subjecting a granular, difficultly dispersible vegetable gum to pulsating vibration while on an inclined plane, exposing said vibrating vegetable gum to the action of a finely divided water spray in an amount sufficient to cause superficial hydration thereof, the angle of inclination of said inclined plane being such that the untreated vegetable gum, due to said pulsating vibration, moves upwardly on said inclined plane, while the treated readily dispersible vegetable gum moves downwardly thereon, and drying the resulting treated vegetable gum to remove absorbed water therefrom.

5. In a process of converting difficultly dispersible farinaceous material into readily dispersible form, the steps which comprise subjecting a granular, difficultly dispersible farinaceous material to pulsating vibration while on an inclined plane, exposing said vibrating farinaceous material to the action of a finely divided water spray in an amount sufficient to cause superficial hydration thereof, the angle of inclination of said inclined plane being such that the untreated farinaceous material, due to said pulsating vibration, moves upwardly on said inclined plane, while the treated readily dispersible farinaceous material moves downwardly thereon, and drying the resulting treated farinaceous material to remove absorbed water therefrom.

6. In a process of converting a difficultly dispersible, water soluble, solid plastic material into readily dispersible form, the steps which comprise subjecting a granular, difficultly dispersible, water soluble plastic material to pulsating vibration while on an inclined plane, exposing said vibrating plastic material to the action of a finely divided water spray in an amount sufficient to cause superficial hydration thereof, the angle of inclination of said inclined plane being such that the untreated plastic material, due to said pulsating vibration, moves upwardly on said inclined plane, while the treated readily dispersible plastic material moves downwardly thereon, and drying the resulting treated plastic material to remove absorbed water therefrom.

7. In a process of converting a difficultly dispersible, particulate, solid inorganic material into readily dispersible form, the steps which comprise subjecting a granular, difficultly dispersible, solid inorganic material to pulsating vibration while on an inclined plane, exposing said vibrating inorganic material to the action of a finely divided water spray in an amount sufficient to cause superficial hydration thereof, the angle of inclination of said inclined plane being such that the untreated inorganic material, due to said pulsating vibration, moves upwardly on said inclined plane, while the treated readily dispersible inorganic material moves downwardly thereon, and drying the resulting treated inorganic material to remove absorbed water therefrom.

8. In a process of converting a difficultly dispersible, solid carbohydrate-containing material into readily dispersible form, the steps which comprise subjecting a granular, difficultly dispersible, solid carbohydrate-containing material to pulsating vibration while on an inclined plane, exposing said vibrating carbohydrate-containing material to the action of a finely divided water spray in an amount sufficient to cause superficial hydration thereof, the angle of inclination of said inclined plane being such that the untreated carbohydrate-containing material, due to said pulsating vibration, moves upwardly on said inclined plane, while the treated readily dispersible carbohydrate-containing material moves downwardly thereon, and drying the resulting treated carbohydrate-containing material to remove absorbed water therefrom.

9. In a process of converting particulate difficultly dispersible, solid dyes and pigments into readily dispersible form, the steps which comprise subjecting a granular, difficultly dispersible material selected from the group consisting of dyes and pigments to pulsating vibration while on an inclined plane, exposing said vibrating material to the action of a finely divided water spray in an amount sufficient to cause superficial hydration thereof, the angle of inclination of said inclined plane being such that the untreated material, due to said pulsating vibration, moves upwardly on said inclined plane, while the treated readily dispersible material moves downwardly thereon, and drying the resulting treated material to remove absorbed water therefrom.

10. In a process of converting difficultly dispersible pectin into readily dispersible form, the steps which comprise subjecting granular, difficultly dispersible pectin to pulsating vibration while on an inclined plane, exposing said vibrating pectin to the action of a finely divided water spray in an amount sufficient to cause superficial hydration thereof, the angle of inclination of said inclined plane being such that the untreated pectin, due to said pulsating vibration, moves upwardly on said inclined plane, while the treated readily dispersible pectin moves downwardly thereon, and drying the resulting treated pectin to remove absorbed water therefrom.

11. In a process of converting difficultly dispersible particulate, substantially solid materials into readily dispersible form, the steps which comprise subjecting the particulate, difficultly dispersible, substantially solid material to pulsating vibration while on an inclined plane, the major portion of said inclined plane adjacent the feed end thereof being unsupported, the direction of the vibration being transverse to said plane, exposing the vibrating material to the action of a liquid agent causing swelling of the material, the angle of inclination being such that the untreated material moves upwardly on said inclined plane due to said pulsating vibration, while the treated, readily dispersible material moves downwardly thereon, and removing said absorbed agent from the resulting treated material.

12. In a process of converting difficultly dispersible sodium carboxy methyl cellulose into readily dispersible form, the steps which comprise subjecting granular, difficultly dispersible sodium carboxy methyl cellulose to pulsating vibration while on an inclined plane, the major portion of said inclined plane adjacent the feed end thereof being unsupported, the direction of the vibration being transverse to said plane, exposing said vibrating sodium carboxy methyl cellulose to the action of a finely divided water spray in an amount sufficient to cause partial hydration thereof, the angle of inclination being such that the untreated material moves upwardly on said inclined plane due to said pulsating vibration, while the treated readily dispersible material moves downwardly thereon, and drying the resulting treated sodium carboxy methyl cellulose to remove absorbed water therefrom.

13. In a process of converting difficultly dispersible water soluble cellulose ethers into readily dispersible form the steps which comprise subjecting a granular difficultly dispersible water soluble cellulose ether to pulsating vibration while on an inclined plane, the major portion of said inclined plane adjacent the feed end thereof being unsupported, the direction of the vibration being transverse to said plane, exposing said vibrating cellulose ether to the action of a finely divided water spray in an amount sufficient to cause partial hydration thereof, the angle of inclination being such that the untreated material moves upwardly on said inclined plane due to said pulsating vibration, while the treated, readily dispersible material moves downwardly thereon, and drying the resulting treated cellulose ether to remove absorbed water therefrom.

14. In a process of converting difficultly dispersible farinaceous material into readily dispersible form, the steps which comprise subjecting a granular difficultly dispersible farinaceous material to pulsating vibration while on an inclined plane, the major portion of said inclined plane adjacent the feed end thereof being unsupported, the direction of the vibration being transverse to said plane, exposing said vibrating farinaceous material to the action of a finely divided water spray in an amount sufficient to cause partial hydration thereof, the angle of inclination being such that the untreated material moves upwardly on said inclined plane due to said pulsating vibration, while the treated, readily dispersible material moves downwardly thereon, and drying the resulting treated farinaceous material to remove absorbed water therefrom.

15. In a process of converting difficultly dispersible inorganic materials into readily dispersible form, the steps which comprise subjecting a granular, difficultly dispersible inorganic material to pulsating vibration while on an inclined plane, the major portion of said inclined plane adjacent the feed end thereof being unsupported, the direction of the vibration being transverse to said plane, exposing said vibrating inorganic material to the action of a finely divided water spray in an amount sufficient to cause partial hydration thereof, the angle of inclination being such that the untreated material moves upwardly on said inclined plane due to said pulsating vibration, while the treated, readily dispersible material moves downwardly thereon, and drying the resulting treated inorganic material to remove absorbed water therefrom.

16. In a process of producing substantially dust-free, free-flowing, and readily dispersible granular materials from solid, particulate materials dusting on handling and difficultly dispersible and agglomerating on contact with liquid dispersing agents, the steps which comprise feeding said starting material to an inclined vibrating surface, the major portion of said inclined surface adjacent the feed end thereof being unsupported, the angle of inclination of said surface being plus or minus about 20° of the angle of repose of said material and the direction of vibration being transverse to said surface, exposing the starting material on said inclined vibrating surface to the action of a liquid agent causing partial swelling of said starting material while exposed to the vibrating action of said inclined vibrating surface, collecting the treated substantially dust-free, free-flowing, and readily dispersible granular material at the lower end of said inclined vibrating surface, separating said treated material from untreated starting material carried along therewith by screening to remove the smaller untreated particles from the larger treated particles, and removing the absorbed liquid agent from said treated material.

17. Readily water-dispersible, substantially dust-free, non-crumbling, free-flowing, granular sodium carboxy methyl cellulose prepared by the process of claim 1, the particles thereof having a sponge-like structure and being resiliently compressible under manual pressure, said particles being of a particle size passing an 8 mesh screen and being completely retained by a 60 mesh screen, said particles repelling each other when added to water and, as a result thereof, not agglomerating and balling up on contact with water, said sodium carboxy methyl cellulose having an apparent bulk density significantly lower than that of more difficultly dispersible sodium carboxy methyl cellulose, said sodium carboxy methyl cellulose being completely dispersible when added to water.

18. A readily water-dispersible, substantially dust-free, free-flowing, granular vegetable gum, prepared by the process of claim 1, the particles thereof having a sponge-like structure and being resiliently compressible under amnual pressure, said particles being of a particle size passing an 8 mesh screen and being completely retained by a 60 mesh screen, said particles repelling each other when added to water and, as a result thereof, not agglomerating and balling up on contact with water, said vegetable gum having an apparent bulk density substantially lower than that of a more difficultly dispersible vegetable gum, said vegetable gum being completely dispersible when added to water.

19. Readily water-dispersible, substantially dust-free, non-crumbling, free-flowing, granular boric acid prepared by the process of claim 1, the particles thereof having a sponge-like structure and being resiliently compressible under manual pressure, said particles being of a particle size passing an 8 mesh screen and being completely retained by a 60 mesh screen, said particles repelling each other when added to water and, as a result thereof, not agglomerating and balling up on contact with water, said boric acid having an apparent bulk density substantially lower than that of more difficultly dispersible boric acid, said boric acid being completely dispersible when added to water.

20. Readily water-dispersible, substantially dust-free, non-crumbling, free-flowing, granular material selected from the group consisting of dyes and pigments prepared by the process of claim 1, the particles thereof having a sponge-like structure, said particles being of a particle size passing an 8 mesh screen and being completely retained by a 60 mesh screen, said particles repelling each other when added to water and, as a result thereof, not agglomerating and balling up on contact with water, said material having an apparent bulk density substantially lower than that of such more difficultly dispersible material, said material being completely, uniformly, and rapidly dispersible when added to water.

21. Readily water-dispersible, substantially dust-free, non-crumbling, free-flowing, granular pectin prepared by the process of claim 1, the particles thereof having a sponge-like structure and being resiliently compressible under manual pressure, said particles being of a particle size passing an 8 mesh screen and being completely retained by a 60 mesh screen, said particles repelling each other when added to water and, as a result thereof, not agglomerating and balling up on contact with water, said pectin having an apparent bulk density substantially lower than that of more difficultly dispersible pectin, said pectin being completely, uniformly, and rapidly dispersible when added to water.

22. Readily water-dispersible, substantially dust-free, non-crumbling, free-flowing, granular food material prepared by the process of claim 1, the particles thereof having a sponge-like structure and being resiliently compressible under manual pressure, said particles being of a particle size passing an 8 mesh screen and being completely retained by a 60 mesh screen, said particles repelling each other when added to water and, as a result thereof, not agglomerating and balling up on contact with water, said food material having an apparent bulk density substantially lower than that of such more difficultly dispersible food material and being completely, uniformly, and rapidly dispersible when added to water.

23. Readily water-dispersible, substantially dust-free, non-crumbling, free-flowing, granular carbohydrate material prepared by the process of claim 1, the particles thereof having a sponge-like structure and being resiliently compressible under manual pressure, said particles being of a particle size passing an 8 mesh screen and being completely retained by a 60 mesh screen, said particles repelling each other when added to water and, as a result thereof, not agglomerating and balling up on contact with water, said carbohydrate material having an apparent bulk density substantially lower than that of such more difficultly dispersible carbohydrate material and being completely, uniformly, and rapidly dispersible when added to water.

24. Readily water-dispersible, substantially dust-free, non-crumbling, free-flowing, granular plastic material prepared by the process of claim 11, the particles thereof having a sponge-like structure and being resiliently compressible under manual pressure, said particles being of a particle size passing an 8 mesh screen and being completely retained by a 60 mesh screen, said particles repelling each other when added to water and, as a result thereof, not agglomerating and balling up on contact with water, said plastic material having an apparent bulk density substantially lower than that of such more difficultly dispersible plastic material and being completely, uniformly, and rapidly dispersible when added to water.

25. Substantially non-dusting, non-crumbling, free-flowing, granular fertilizer material prepared by the process of claim 1, the particles thereof being of a particle size passing an 8 mesh screen and being completely retained by a 60 mesh screen, said particles repelling each other when added to water and, as a result thereof, not agglomerating and balling up on contact with water, said fertilizer material having an apparent bulk density substantially lower than that of fertilizer material agglomerating and balling up on contact with water, said fertilizer material being completely dispersible when added to water.

26. In a process of producing a readily dispersible, dust-free, granular reaction product, the steps which comprise subjecting a finely divided solid material to pulsating vibration while on an inclined plane, the direction of the vibration being transverse to said plane, and exposing the vibrating material to the action of a finely divided spray of a liquid reagent reacting with said material and causing partial swelling thereof, the angle of inclination of the plane and the direction and amplitude of the vibration being such that unreacted material moves upwardly on said inclined plane due to said pulsating vibration while the reacted material moves downwardly thereon, the reaction between the material and said reagent producing said reaction product.

27. The process of claim 26, wherein said material is an alkaline metal compound and said reagent is an acid.

28. The process of claim 26, wherein said material is an acidic metal compound and said reagent is an alkaline liquid.

29. In a continuous process of producing a readily dispersible, substantially dust-free, granular reaction product, the steps which comprise flowing particles of a finely divided, difficultly dispersible starting material from a feed zone to a discharge zone along an inclined plane, impinging a controlled amount of a fluid reacting agent against the surface of said particles, said agent being capable of converting said starting material into discrete free-flowing granular particles of the reaction product and causing partial swelling thereof, simultaneously and continuously exposing said particles to pulsating vibration throughout their travel down the inclined plane, the direction of the vibration being transverse to said plane, the angle of inclination of the plane and the direction and amplitude of the vibration being such that the substantially completely reacted particles are separated from the unreacted and incompletely reacted particles, and discharging said reacted particles from the lower end of said inclined plane while the unreacted and incompletely reacted starting particles remain on the upper part of the inclined plane until reacted, whereby any unreacted and incompletely reacted starting material carried downwardly by the reacted particles reverse their direction and move upwardly and are thus again subjected to the treatment with the fluid reacting agent.

30. The process of claim 29, wherein said starting material is an alkaline metal compound and said reacting agent is an acid.

31. The process of claim 29, wherein said starting material is an acidic metal compound and said reacting agent is an alkaline agent.

32. In a continuous process of producing a readily dispersible, substantially dust-free granular detergent composition containing, as one of the active detergents, the sodium salt of a detergent acid, the steps which comprise flowing finely divided particles of a detergent composition free of detergent acid component but containing sodium carbonate from a feed zone to a discharge zone along an inclined plane, impinging a controlled amount of a concentrated aqueous solution of the detergent acid against the surface of said particles, simultaneously and continuously exposing said particles to pulsating vibration throughout their travel down the inclined plane, the direction of the vibration being transverse to said plane, the angle of inclination of the plane and the direction and amplitude of the vibration being such that the granulated particles of the detergent composition containing the sodium salt of the detergent acid formed by said impingement of the solution of the detergent acid on said sodium carbonate-containing composition are separated from the non-granulated particles of the unreacted and incompletely reacted particles of the starting sodium carbonate-containing composition, and discharging the reacted granular detergent composition from the lower end of said inclined plane while the unreacted and incompletely reacted starting particles remain on the upper part of the inclined plane until reacted, whereby any unreacted and incompletely reacted starting material carried downwardly by the reacted particles reverse their direction and move upwardly and are thus again subjected to the treatment with the solution of the detergent acid.

33. The process according to claim 32, wherein the detergent acid is dodecyl benzene sulfonic acid.

34. In a continuous process of producing a readily dispersible, substantially dust-free, granular readily water dispersible sodium caseinate, the steps which comprise flowing finely divided particles of casein from a feed zone to a discharge zone along an inclined plane, impinging a controlled amount of a sodium hydroxide solution against the surface of said particles, simultaneously and continuously exposing said particles to pulsating vibration throughout their travel down the inclined plane, the direction of the vibration being transverse to said plane, the angle of inclination of the plane and the direction and amplitude of the vibration being such that the substantially completely reacted sodium caseinate particles are separated from unreacted and incompletely reacted casein particles, and discharging the sodium caseinate particles from the lower end of said inclined plane, while the unreacted and incompletely reacted casein particles remain on the upper part of the inclined plane until reacted, whereby any unreacted and incompletely reacted casein particles carried downwardly by the reacted sodium caseinate particles reverse their direction and move upwardly and are thus again subjected to the treatment with sodium hydroxide solution.

35. In a continuous process of producing a readily dispersible substantially dust-free granular sodium molybdate, the steps which comprise flowing finely divided particles of molybdenum trioxide and sodium carbonate from a feed zone to a discharge zone along an inclined plane, impinging a controlled amount of a sodium hydroxide solution against the surface of said particles, simultaneously and continuously exposing said particles to pulsating vibration throughout their travel down the inclined plane, the direction of the vibration being transverse to said plane, the angle of inclination of the plane and the direction and amplitude of the vibration being such that the substantially completely reacted sodium molybdate particles are separated from the unreacted and incompletely reacted particles of molybdenum trioxide and sodium carbonate, and discharging the sodium molybdate particles from the lower end of said inclined plane, while the unreacted and incompletely reacted molybdenum trioxide and sodium carbonate particles remain on the upper part of the inclined plane until reacted, whereby any unreacted and incompletely reacted molybdenum trioxide and sodium carbonate particles carried downwardly reverse their direction and move upwardly and are thus again subjected to the treatment with sodium hydroxide solution.

No references cited.

DONALD E. CZAJA, *Primary Examiner.*

R. W. MULCAHY, *Assistant Examiner.*